US009523518B2

(12) United States Patent
Kitamura et al.

(10) Patent No.: US 9,523,518 B2
(45) Date of Patent: Dec. 20, 2016

(54) REFRIGERATION CYCLE DEVICE

(71) Applicants: DENSO CORPORATION, Kariya, Aichi-pref. (JP); DENSO AIR SYSTEMS CORPORATION, Anjo, Aichi-pref. (JP)

(72) Inventors: Keiichi Kitamura, Handa (JP); Shiho Hashimoto, Chita-gun (JP); Mitsuyoshi Tanaka, Anjo (JP); Junichi Ono, Anjo (JP)

(73) Assignees: DENSO CORPORATION, Kariya, Aichi-pref. (JP); DENSO AIR SYSTEMS CORPORATION, Anjo, Aichi-pref. (JP)

( * ) Notice: Subject to any disclaimer, the term of this patent is extended or adjusted under 35 U.S.C. 154(b) by 46 days.

(21) Appl. No.: 14/443,129

(22) PCT Filed: Nov. 12, 2013

(86) PCT No.: PCT/JP2013/006635
§ 371 (c)(1),
(2) Date: May 15, 2015

(87) PCT Pub. No.: WO2014/076934
PCT Pub. Date: May 22, 2014

(65) Prior Publication Data
US 2015/0292780 A1 Oct. 15, 2015

(30) Foreign Application Priority Data

Nov. 16, 2012 (JP) ................................. 2012-252015
Sep. 10, 2013 (JP) ................................. 2013-186928
Oct. 11, 2013 (JP) ................................. 2013-213389

(51) Int. Cl.
*F25B 13/00* (2006.01)
*B60H 1/32* (2006.01)
(Continued)

(52) U.S. Cl.
CPC ........... *F25B 13/00* (2013.01); *B60H 1/00921* (2013.01); *B60H 1/3229* (2013.01); *F25B 5/04* (2013.01);
(Continued)

(58) Field of Classification Search
CPC . F25B 13/00; F25B 49/005; F25B 2400/0409; F25B 5/04; F25B 2341/0662; B60H 1/3229; B60H 1/00921
(Continued)

(56) References Cited

U.S. PATENT DOCUMENTS 5,598,887 A * 2/1997 Ikeda ................. B60H 1/00392
165/202
6,076,366 A 6/2000 Takano et al.
(Continued)

FOREIGN PATENT DOCUMENTS

JP H02062371 U 5/1990
JP H10300280 A 11/1998
(Continued)

OTHER PUBLICATIONS

International Search Report and Written Opinion (in Japanese with English Translation) for PCT/JP2013/006635, mailed Jan. 28, 2014; ISA/JP.

*Primary Examiner* — Mohammad M Ali
(74) *Attorney, Agent, or Firm* — Harness, Dickey & Pierce, P.L.C.

(57) ABSTRACT

A refrigeration cycle device includes a flow channel coupling member which constitutes at least one of a branching portion and a joining portion of a third refrigerant passage and a branching portion and a joining portion of a bypass passage. One of three refrigerant ports of the flow channel coupling member is directly connected to one of two refrigerant ports of a first switching device or a second switching device, and a sealing mechanism preventing a refrigerant leakage is provided in a connecting portion between the refrigerant port of the flow channel coupling member and the refrigerant port of the first switching device or the second switching device. The flow channel coupling member is
(Continued)

fixed to one of the switching devices at a position different from a position of the sealing mechanism.

15 Claims, 17 Drawing Sheets

(51) Int. Cl.
    *F25B 5/04*     (2006.01)
    *F25B 49/00*     (2006.01)
    *F25B 41/00*     (2006.01)
    *B60H 1/00*     (2006.01)

(52) U.S. Cl.
    CPC .......... F25B 41/003 (2013.01); F25B 49/005 (2013.01); *F25B 2341/0662* (2013.01); *F25B 2400/0409* (2013.01); *F25B 2500/221* (2013.01)

(58) Field of Classification Search
    USPC ........................................ 62/324.1, 244, 239
    See application file for complete search history.

(56) References Cited

U.S. PATENT DOCUMENTS

| | | | | |
|---|---|---|---|---|
| 6,230,506 B1 * | 5/2001 | Nishida | .............. | B60H 1/00907 62/160 |
| 8,671,707 B2 * | 3/2014 | Inaba | ................. | B60H 1/00899 62/324.6 |
| 2004/0079096 A1 * | 4/2004 | Itoh | .................... | B60H 1/00735 62/223 |
| 2005/0028547 A1 * | 2/2005 | Hatakeyama | ...... | B60H 1/00921 62/324.1 |
| 2006/0191280 A1 * | 8/2006 | Kurosawa | .......... | B60H 1/00921 62/324.1 |
| 2010/0326127 A1 * | 12/2010 | Oomura | ............. | B60H 1/00785 62/498 |
| 2011/0005255 A1 * | 1/2011 | Tanihata | ............ | B60H 1/00785 62/238.7 |
| 2011/0016896 A1 * | 1/2011 | Oomura | ............. | B60H 1/00785 62/155 |
| 2011/0048671 A1 * | 3/2011 | Nishikawa | ......... | B60H 1/00885 165/42 |
| 2011/0167850 A1 * | 7/2011 | Itoh | ........................... | F25B 5/04 62/160 |
| 2012/0227428 A1 * | 9/2012 | Yokoo | ................ | B60H 1/00921 62/126 |
| 2012/0255319 A1 | 10/2012 | Itoh et al. | | |

FOREIGN PATENT DOCUMENTS

| | | |
|---|---|---|
| JP | H11344264 A | 12/1999 |
| JP | 2001140289 A | 5/2001 |
| JP | 2002174354 A | 6/2002 |
| JP | 2002364947 A | 12/2002 |
| JP | 2009293866 A | 12/2009 |
| JP | 2011140291 A | 7/2011 |
| JP | 2012225637 A | 11/2012 |

* cited by examiner

COMPARATIVE EXAMPLE

REFRIGERATION CYCLE DEVICE

CROSS REFERENCE TO RELATED APPLICATIONS

This application is a U.S. National Phase Application under 35 U.S.C. 371 of International Application No. PCT/JP2013/006635 filed on Nov. 12, 2013 and published in Japanese as WO 2014/076934 A1 on May 22, 2014. This application is based on and claims the benefit of priority from Japanese Patent Applications No. 2012-252015 filed on Nov. 16, 2012, No. 2013-186928 filed on Sep. 10, 2013, and No. 2013-213389 filed on Oct. 11, 2013. The entire disclosures of all of the above applications are incorporated herein by reference.

TECHNICAL FIELD

The present disclosure relates to a refrigeration cycle device applied to an air-conditioning apparatus configured to perform a dehumidification operation in which air blown to a space to be air-conditioned is cooled and dehumidified and the dehumidified blown air is heated.

BACKGROUND ART

In the related art, examples of a vehicle air conditioning apparatus provided with a refrigeration cycle include a configuration provided with an evaporator and a condenser arranged in an air conditioning case and an outside heat exchanger arranged on an outside of a vehicle cabin and configured to be capable of switching circuits to one of a refrigerant circuit for a cooling mode, a refrigerant circuit for a heating mode, and a refrigerant circuit for a dehumidification mode by a switching valve provided in the refrigerant circuits. In the heating mode, heating is achieved by a heat pump cycle.

Since the heating mode with the heat pump cycle may suffer from a problem that a heating performance cannot be secured when outside air is extremely low such as −30° C., a vehicle air conditioning apparatus configured to be capable of securing the heating performance when the outside air is extremely low is proposed in Patent Document 1 and Patent Document 2.

In the related art, a switching device for switching the refrigerant circuit to one of the refrigerant circuit for the cooling mode, the refrigerant circuit for a first heating mode, and the refrigerant circuit for a second heating mode is provided.

In the refrigerant circuit for the first heating mode, a refrigerant discharged from the compressor flows into a radiator, a heating decompression device, and an outside heat exchanger in this order, and the refrigerant flowing out of the outside heat exchanger flows to an intake side of the compressor with bypassing the evaporator. Accordingly, the outside heat exchanger causes the refrigerant to absorb heat, and the radiator causes the refrigerant to radiate heat.

In the refrigerant circuit for the second heating mode, a refrigerant discharged from the compressor flows into the radiator, and the refrigerant flowing out of the radiator flows to the intake side of the compressor with bypassing both of the outside heat exchanger and the evaporator. Accordingly, the radiator causes the refrigerant to radiate heat.

A vehicle air conditioning apparatus that enlarges an adjustable range of temperature of blow-out air into a space to be air-conditioned during the dehumidification operation is proposed in Patent Document 2.

The vehicle air conditioning apparatus described in Patent Document 2 is provided with a first opening-and-closing apparatus and a second opening-and-closing apparatus as a switching device configured to switch the refrigerant circuit to one of a refrigerant circuit for a cooling mode, a refrigerant circuit for a heating mode, a first dehumidification heating mode, and a second dehumidification heating mode.

More specifically, the vehicle air conditioning apparatus includes a first refrigerant passage configured to guide refrigerant flowing out of the radiator to an intake side of the outside heat exchanger, a first throttling device capable of changing an open area of the first refrigerant passage, a second refrigerant passage configured to guide the refrigerant flowing out of the outside heat exchanger to an inlet side of the compressor, the first opening-and-closing apparatus configured to open or close the second refrigerant passage, a third refrigerant passage configured to guide the refrigerant flowing out of the outside heat exchanger to the inlet side of the compressor via an evaporator, a second throttling device capable of changing an open area between the outside heat exchanger and the evaporator in the third refrigerant passage, a bypass passage configured to guide the refrigerant flowing between the radiator and the first throttling device to a portion between the outside heat exchanger and the second throttling device in the third refrigerant passage, and the second opening-and-closing apparatus configured to open and close the bypass passage.

PRIOR ART DOCUMENT

Patent Document

Patent Document 1: JP 2011-140291 A
Patent Document 2: JP 2012-225637 A

SUMMARY OF THE INVENTION

However, according to a study of inventors of the present application, with the vehicle air conditioning apparatus described in Patent Document 2, two bypass passages and two switching valves are required, and hence an increase in occupied space within the vehicle may result and, at the same time, an increase in cost due to an increase in number of components may result. For example, there are cases requiring a branching member configured to cause the bypass passage to branch before or after the switching valve in refrigerant flow, a piping member which forms the bypass passage, and a connector for connecting the piping member and the switching valves.

Since a pressure loss of the refrigerant is increased with the provision of the piping member, there may be a risk of lowering of a cooling performance and a heating performance.

In addition, with the provision of the piping member, the capacity of the refrigerant flow channel is increased as an entire cycle. Therefore, a sealed amount of the refrigerant and the refrigerant oil increases, and hence economical performance may be lowered. The refrigerant oil has a role to lubricate the compressor and is mixed into the refrigerant to circulate in the cycle.

When a low-pressure refrigerant at 0° C. or lower flows at a joint portion between the connector and the piping member, ice may be built up on the joint portion, and a refrigerant leakage may be caused. For example, in the case where the connector and the piping member are joined by being fitted to each other by male-female fitting, and brazing the fit portion, and sealing is applied against the refrigerant leakage from the fit portion, a crack may develop due to building up of ice in a pin hole at the brazed portion, and a risk of a leakage of the refrigerant from the crack may arise.

In view of such points, it is an objective of the present disclosure to reduce an occupied space within a vehicle, reduce the number of components, improve a cooling performance and a heating performance, reduce a sealed amount of refrigerant and refrigerant oil, and reduce a refrigerant leakage, in a refrigeration cycle device that enlarges a temperature adjustment range of the blown out air into the space to be air-conditioned during the dehumidification operation.

According to an aspect of the present disclosure, a refrigeration cycle device is used for an air-conditioning apparatus that performs a dehumidification operation in which an air blown to a space to be air-conditioned is cooled and dehumidified and the dehumidified blown air is heated. The refrigeration cycle device includes a compressor that compresses and discharges a refrigerant, a radiator in which the refrigerant discharged from the compressor radiates a heat, an outside heat exchanger in which the refrigerant flowing out of the radiator exchanges heat with an outside air, an evaporator in which the refrigerant flowing out of the outside heat exchanger is evaporated via heat exchange between the refrigerant flowing out of the outside heat exchanger and the blown air before passing through the radiator, a first refrigerant passage guiding the refrigerant flowing out of the radiator to an inlet side of the outside heat exchanger, a first throttling device having two refrigerant ports to or from which the refrigerant flows in or out, the first throttling device being disposed in the first refrigerant passage and being capable of changing an open area of the first refrigerant passage, a second refrigerant passage guiding the refrigerant flowing out of the outside heat exchanger to an intake side of the compressor, a first switching device having two refrigerant ports to or from which the refrigerant flows in or out, the first switching device being disposed in the second refrigerant passage and selectively stopping a flow of the refrigerant in the second refrigerant passage, a third refrigerant passage branching from the second refrigerant passage and joining to the second refrigerant passage, the third refrigerant passage guiding the refrigerant flowing out of the outside heat exchanger to the intake side of the compressor through the evaporator, a second throttling device having two refrigerant ports to or from which the refrigerant flows in or out, the second throttling device being disposed between the outside heat exchanger and the evaporator in the third refrigerant passage and being capable of changing an open area of the third refrigerant passage, a bypass passage branching from the first refrigerant passage and joining to the third refrigerant passage, the bypass passage guiding the refrigerant flowing between the radiator and the first throttling device to a part of the third refrigerant passage between the outside heat exchanger and the second throttling device, a second switching device having two refrigerant ports to or from which the refrigerant flows in or out, the second switching device being disposed in the bypass passage and selectively stopping the flow of the refrigerant in the bypass passage, and a flow channel coupling member having three refrigerant ports to or from which the refrigerant flows in or out, the flow channel coupling member being provided in at least one of a branching portion and a joining portion of the third refrigerant passage and a branching portion and a joining portion of the bypass passage. One of the three refrigerant ports of the flow channel coupling member is directly connected to one of the two refrigerant ports of the first switching device or one of the two refrigerant ports of the second switching device. The refrigeration cycle device further includes a sealing mechanism provided in a connecting portion between the refrigerant port of the flow channel coupling member and the refrigerant port of the first switching device or in a connecting portion between the refrigerant port of the flow channel coupling member and the refrigerant port of the second switching device. The sealing mechanism prevents a refrigerant leakage. The flow channel coupling member has a portion that is different in position from the sealing mechanism and is fixed to the first switching device or the second switching device.

In this configuration, since the refrigerant port of the flow channel coupling member is directly connected to the refrigerant port of the switching device, a refrigerant piping is not required between the flow channel coupling member and the switching device. Therefore, the occupied space within the vehicle can be reduced and the number of components can be reduced.

Since the refrigerant piping is not required between the flow channel coupling member and the switching device, a pressure loss of the refrigerant can be reduced, and consequently, the cooling performance and the heating performance can be improved.

In addition, since the refrigerant piping is not required between the flow channel coupling member and the switching device, a capacity of the refrigerant flow channel can be reduced as an entire cycle. Therefore, sealed amounts of the refrigerant and the refrigerant oil may be reduced.

In addition, the flow channel coupling member has the portion that is different in position from the sealing mechanism and is fixed to the switching device. Even though a crack occurs at the fixed portion between the flow channel coupling member and the switching device, the sealing mechanism can prevent a refrigerant leakage.

EMBODIMENTS FOR EXPLOITATION OF THE INVENTION

Figure 1:
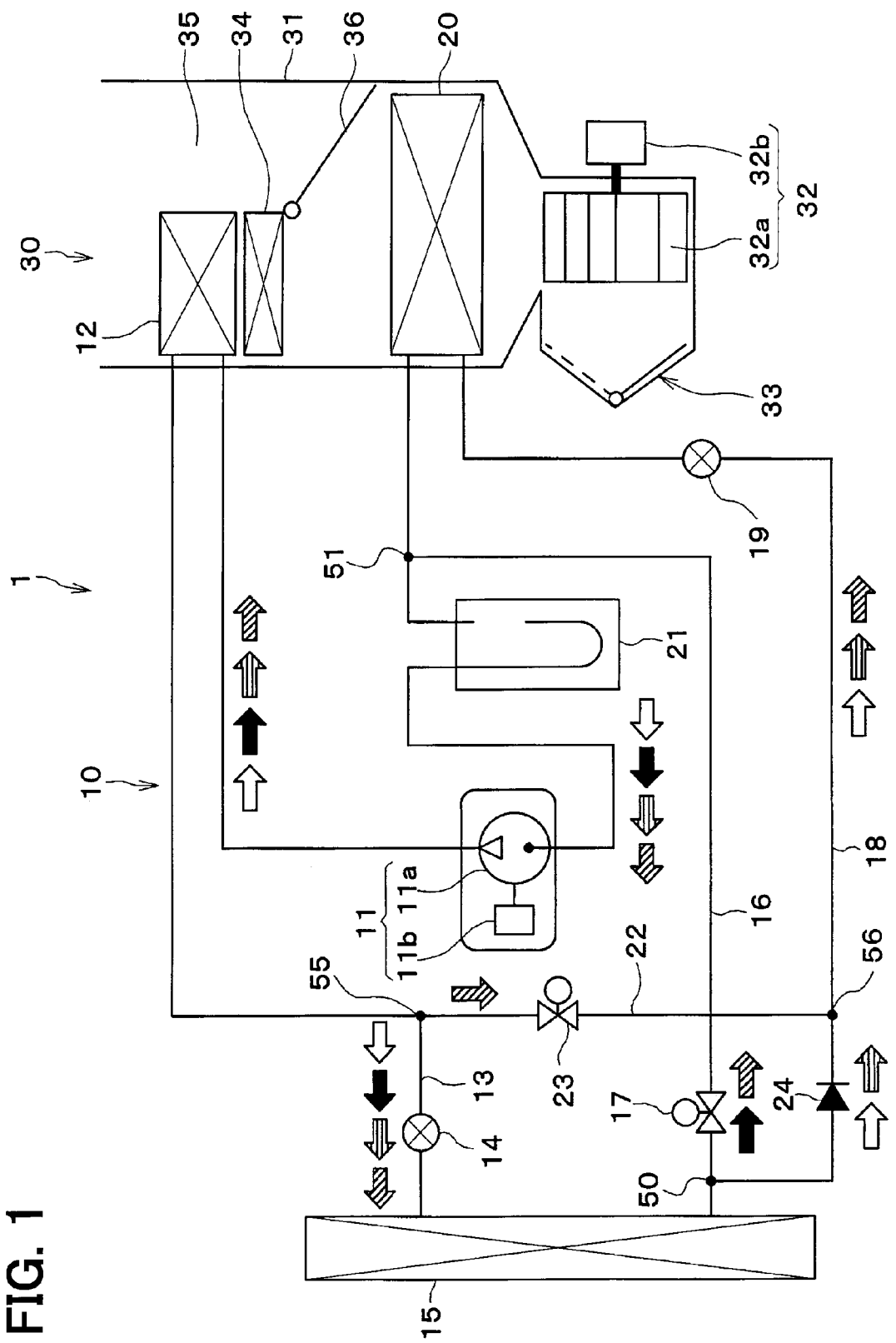
FIG. 1 is a schematic diagram illustrating a vehicle air conditioning apparatus according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment will be described with reference to FIGs. 1 to 8-1 is a schematic configuration drawing illustrating a vehicle air conditioning apparatus 1 of the present embodiment.

In the present embodiment, a refrigeration cycle device 10 is applied to the vehicle air conditioning apparatus 1 for a hybrid vehicle that obtains a drive force for the traveling of a vehicle from an internal combustion engine (an engine) and a traveling electric motor. The refrigeration cycle device 10 of the vehicle air conditioning apparatus 1 functions to cool or heat air to be blown into the vehicle interior that is a space to be air-conditioned.

Therefore, the refrigeration cycle device 10 is configured to be capable of switching the refrigerant flow channel among a refrigerant flow channel in a cooling mode (cooling operation) for cooling the vehicle interior, a refrigerant flow channel in a dehumidification heating mode (dehumidification operation) for heating and dehumidifying the vehicle interior, and a refrigerant flow channel in a heating mode (heating operation) for heating the vehicle interior.

In addition, in the refrigeration cycle device 10, as described later as the dehumidification heating mode, a first dehumidification heating mode to be executed in a normal condition, and a second dehumidification heating mode to be executed when the outside air temperature is extremely low can be executed.

The refrigeration cycle device 10 of the present embodiment employs a normal fluorocarbon refrigerant as the refrigerant, and constitutes a part of a subcritical refrigeration cycle in which a high pressure refrigerant pressure does not exceed a critical pressure of the refrigerant. Further, a refrigerant oil for lubricating a compressor 11, which will be described later, is mixed with the refrigerant, and a part of the refrigerant oil is circulated in the cycle together with the refrigerant.

The compressor 11 is an electric compressor arranged in an engine room (illustration is omitted) and sucks, compresses, and discharges the refrigerant in the refrigeration cycle device 10, is configured to drive a fixed capacity type compression mechanism 11a with a fixed discharge capacity by an electric motor 11b. Various compression mechanisms specifically as a scroll-type compression mechanism and a vane-type compression mechanism can be employed as the compression mechanism 11a.

An operation (a number of rotations) of the electric motor 11b is controlled by a control signal that is output from a control device (illustration is omitted), which will be described later, and any type of an AC motor and a DC motor may be employed as the electric motor 11b. The refrigerant discharging capacity of the compression mechanism a changes according to the number-of-rotations control. Therefore, in the present embodiment, the electric motor 11b constitutes a part of discharge capacity change device of the compression mechanism 11a.

An inlet side of an inside condenser 12 is connected to a discharge port side of the compressor 11. The inside condenser 12 is arranged in a casing 31 of an inside air conditioning unit 30, which will be described later, and is configured to radiate heat of a discharged refrigerant (high-pressure refrigerant) discharged from the compressor 11 to heat an air that has passed through an inside evaporator 20 to the vehicle interior. The inside condenser 12 is used as an example of a radiator configured to radiate the heat of the discharged refrigerant discharged from the compressor 11.

A first refrigerant passage 13 configured to guide the refrigerant flowing out of the inside condenser 12 into an outside heat exchanger 15 is connected to an outlet side of the inside condenser 12. A first expansion valve (a first throttling device) 14 configured to be capable of changing a passage surface area (throttle opening) of the first refrigerant passage 13 is arranged in the first refrigerant passage 13.

More specifically, the first expansion valve 14 is an electric variable throttle mechanism including a valve body configured to be capable of changing the passage opening (throttle opening) of the first refrigerant passage 13, and an electric actuator including a stepping motor configured to change the throttle opening of the valve body.

The first expansion valve 14 of the present embodiment includes a variable throttle mechanism provided with a fully-opening function configured to fully open the first refrigerant passage 13 when the throttle opening is fully opened. In other words, the first expansion valve 14 may be configured not to exercise a refrigerant decompression effect by fully opening the first refrigerant passage 13. Meanwhile, the operation of the first expansion valve 14 is controlled by a control signal that is output from the control device.

The inlet side of the outside heat exchanger 15 is connected to an outlet side of the first expansion valve 14. The outside heat exchanger 15 is configured to exchange heat between the refrigerant flowing in the interior thereof and outside air blown from a blower fan (illustration is omitted). The outside heat exchanger 15 functions as an evaporator configured to exercise a heat absorbing effect by evaporating the refrigerant in the heating mode, which will be described later, and functions as a radiator configured to radiate heat from the refrigerant in a cooling mode.

A second refrigerant passage 16 configured to guide the refrigerant flowing out of the outside heat exchanger 15 to an intake side of the compressor 11 via an accumulator 21, which will be described later, and a third refrigerant passage 18 configured to guide the refrigerant flowing out of the outside heat exchanger 15 into the accumulator 21 via an inside evaporator 20, which will be described later are connected to an outlet side of the outside heat exchanger 15.

A first opening-and-closing valve (first switching device) 17 is arranged in the second refrigerant passage 16. The first opening-and-closing valve 17 is an electromagnetic valve configured to selectively stop a refrigerant flow in the second refrigerant passage 16 by opening and closing the second refrigerant passage 16, and is controlled in operation thereof by a control signal output from the control device.

In a case where the first opening-and-closing valve 17 is opened, a pressure loss occurring when the refrigerant passes through the second refrigerant passage 16 is smaller than a pressure loss occurring when the refrigerant passes through the third refrigerant passage 18. The reason is that a check valve 24 and a second expansion valve 19, which will be described later, are arranged in the third refrigerant passage 18. Therefore, the refrigerant flowing out of the outside heat exchanger 15 flows toward the second refrigerant passage 16 when the first opening-and-closing valve 17 is opened, and flows toward the third refrigerant passage 18 when the first opening-and-closing valve 17 is closed.

In this manner, the first opening-and-closing valve 17 functions to switch a cycle configuration (refrigerant flow channel) by opening and closing the second refrigerant passage 16. Therefore, the first opening-and-closing valve 17 constitutes a part of a refrigerant flow channel switching device configured to switch the refrigerant flow channel of the refrigerant circulating in the cycle.

A second expansion valve (a second throttling device) 19 configured to be capable of changing a passage surface area (throttle opening) of the third refrigerant passage 18 is arranged in the third refrigerant passage 18. More specifically, the second expansion valve 19 is an electric variable throttle mechanism including a valve body configured to be capable of changing the passage opening (throttle opening) of the third refrigerant passage 18, and an electric actuator including a stepping motor configured to change the throttle opening of the valve body.

The second expansion valve 19 of the present embodiment has a variable throttling mechanism including a fully-opening function for fully opening the third refrigerant passage 18 when the throttle opening is fully opened, and a fully-closing function for closing the third refrigerant passage 18 when the throttle opening is fully closed. In other words, the second expansion valve 19 is capable of disabling the refrigerant decompression effect and opening and closing the third refrigerant passage 18. The operation of the second expansion valve 19 is controlled by a control signal that is output from the control device.

An inlet side of the inside evaporator 20 is connected to an outlet side of the second expansion valve 19. The inside evaporator 20 is arranged on an upstream side of the inside condenser 12 in a flow of the air blown to the vehicle interior in the casing 31 of the inside air conditioning unit 30. The inside evaporator 20 is configured to cool the air to be blown into the vehicle interior by letting the refrigerant evaporate and exert a heat absorption effect via heat exchange between the air before passing through the inside condenser 12 and the refrigerant flowing in the inside evaporator 20 in the cooling mode and the dehumidification heating mode. The inside evaporator 20 is used as an example of the evaporator configured to evaporate the refrigerant flowing out of the outside heat exchanger 15.

An inlet side of the accumulator 21 is connected to an outlet side of the inside evaporator 20. The accumulator 21 is a gas-liquid separator configured to separate the refrigerant flowed into the interior thereof into gas and liquid and accumulate excess of the refrigerant in the cycle. A suction port side of the compressor 11 is connected to an outlet port of the gas-phase refrigerant of the accumulator 21. Therefore, the accumulator 21 has a function of restricting the liquid-phase refrigerant from being sucked into the compressor 11 and preventing a liquid compression of the compressor 11.

In the present embodiment, a bypass passage 22 configured to guide the refrigerant in a range from the outlet side of the inside condenser 12 to the inlet side of the first expansion valve 14 in the first refrigerant passage 13 to a range from the outlet side of the outside heat exchanger 15 to the inlet side of the second expansion valve 19 in the third refrigerant passage 18 is provided. In other words, the bypass passage 22 is a refrigerant passage configured to guide the refrigerant flowing out of the inside condenser 12 to the inlet side of the second expansion valve 19 by bypassing the first expansion valve 14 and the outside heat exchanger 15.

A second opening-and-closing valve (a second switching device) 23 is arranged in the bypass passage 22. The second opening-and-closing valve 23 is an electromagnetic valve for opening and closing the bypass passage 22, and the operation thereof is controlled by a control signal output from the control device.

The second opening-and-closing valve 23 functions to switch a cycle configuration (refrigerant flow channel) by opening and closing the bypass passage 22. Therefore, the second opening-and-closing valve 23 constitutes a part of a refrigerant flow channel switching device configured to switch the refrigerant flow channel of the refrigerant circulating in the cycle together with the first opening-and-closing valve 17.

In the present embodiment, a check valve (a reverse flow preventing device) 24 is arranged between the outlet side of the outside heat exchanger 15 in the third refrigerant passage 18 and a joining portion of the bypass passage 22 to the third refrigerant passage 18. The check valve 24 allows a flow of the refrigerant from the outlet side of the outside heat exchanger 15 to the inlet side of the second expansion valve 19, and prohibits a flow of the refrigerant from the inlet side of the second expansion valve 19 to the outlet side of the outside heat exchanger 15, and the refrigerant joined by the check valve 24 from the bypass passage 22 to the third refrigerant passage 18 may be prevented from flowing toward the outside heat exchanger 15.

Next, the inside air conditioning unit 30 will be described. The inside air conditioning unit 30 is arranged inside of a dashboard panel (an instrument panel) in a foremost portion of the vehicle interior, and accommodates a blower 32, the above-described inside condenser 12 and the inside evaporator 20 and a heater core 34 accommodated in the casing 31 which forms an outer shell thereof.

The casing 31 forms an air passage for air to be blown into the vehicle interior, and is made of a resin (for example, polypropylene) that has a certain degree of elasticity and is also excellent in terms of strength. An inside-outside air switching unit 33 configured to switch and guide the vehicle interior air (inside air) and outside air is arranged on the most upstream side in the casing 31 in the flow of the blown air.

The inside-outside air switching unit 33 is provided with an inside air inlet port for guiding the inside air into the interior of the casing 31 and an outside air inlet port for guiding the outside air therein. Furthermore, the inside-outside air switching unit 33 includes an inside-outside air switching door configured to adjust open areas of the inside air inlet port and the outside air inlet port continuously to change a rate of air volume between an air volume of the inside air and an air volume of the outside air arranged in the interior thereof.

The blower 32 that blows the air guided through the inside-outside air switching unit 33 toward the vehicle interior is arranged on an air flow downstream side of the inside-outside air switching unit 33. The blower 32 is an electrical blower that drives a centrifugal multi-blade fan (a sirocco fan) 32a with an electric motor 32b, and the number of rotations (a blowing rate) thereof is controlled by a control signal (control voltage) that is output from a control device described later. The centrifugal multi-blade fan 32a functions as a blower configured to blow air to the vehicle interior.

The inside evaporator 20, the heater core 34, and the inside condenser 12 are disposed in this order on the downstream side of the blower 32 in the flow of the air that is to be blown into the vehicle interior. In other words, the inside evaporator 20 is arranged on upstream sides of the inside condenser 12 and the heater core 34 in the flow direction of the air blown to the vehicle interior.

Here, the heater core 34 is a heating heat exchanger for heat exchange between a coolant for an engine, which outputs a drive force for the traveling of a vehicle, and the air blown to the vehicle interior. The heater core 34 of the present embodiment is arranged on the upstream side of the inside condenser 12 in the flowing direction of the air blown to the vehicle interior. Furthermore, a cold air bypass passage 35, which allows air having passed through the inside evaporator 20 to bypass and flow through the inside condenser 12 and the heater core 34 is formed in the casing 31.

An air mixing door 36 configured to adjust a rate of an air volume that passes through the inside condenser 12 and the heater core 34 and air passing through the cold air bypass passage 35 from air after having passed through the inside evaporator 20 is provided on an air flow downstream side of the inside evaporator 20 and an air flow upstream side of the inside condenser 12 and the heater core 34. A mixing space for mixing air passed through the inside condenser 12 and air passed through the cold air bypass passage 35 is provided on the air flow downstream side the inside condenser 12 and on the air flow downstream side in the cold air bypass passage 35.

In addition, an outlet port (illustration is omitted) through which the air conditioning wind mixed in the mixing space is blown into the vehicle interior as the space to be air-conditioned, is arranged on the most downstream side in the casing 31 in the flow of the blown air. Specifically, a face outlet port through which the air conditioning wind is blown out toward an upper body of an occupant present in the vehicle interior, a foot outlet port through which the air conditioning wind is blown out toward feet of an occupant, and a defroster outlet port through which the air conditioning wind is blown out toward an inner surface of a front windshield of a vehicle are provided as this outlet port.

Accordingly, since the air mixing door 36 adjusts the rate of air volume between air passing through the inside condenser 12 and air passing through the cold air bypass passage 35, the temperature of the air-conditioning wind mixed in the mixing space is adjusted. As a result, the temperature of the air-conditioning wind blown out from each of the outlet ports is adjusted. The air mixing door 36 is driven by a servo motor (illustration is omitted) operated by a control signal output from the control device.

Furthermore, a face door (illustration is omitted) for adjusting the open areas of the face outlet ports, a foot door (illustration is omitted) for adjusting the open areas of the foot outlet ports, and a defroster door (illustration is omitted) for adjusting the open areas of the defroster outlet ports are arranged, respectively, on the upstream sides of the face outlet ports, the foot outlet ports and the defroster outlet ports in the flow of the blown air.

The face door, the foot door and the defroster door constitute a part of an outlet port mode switching device configured to switch an outlet port mode, and are driven by the servo motor (illustration is omitted) controlled in operation by the control signal output from the control device, described later, via a link mechanism or the like.

Subsequently, an electric control unit of the present embodiment will be described. The control device includes a known microcomputer including a CPU, a ROM, and a RAM and peripheral circuits thereof, performs various computations and processes on the basis of a control program memorized in the ROM, and controls operations of the various control instruments connected to an output side thereof.

Also, various air conditioning control sensor sets, such as an inside air sensor configured to detect a vehicle interior temperature Tr, an outside air sensor configured to detect an outside air temperature Tam, a solar radiation sensor configured to detect an amount of solar radiation Ts in the vehicle interior, an evaporator-temperature sensor as an evaporator blow-out air temperature detecting unit configured to detect a blow-out air temperature (evaporator temperature) Te from the inside evaporator 20, a discharge temperature sensor Td configured to detect the temperature of the refrigerant discharged from the compressor 11, and a blow-out air temperature sensor as a blow-out air temperature detecting unit configured to detect a blow-out air temperature (vehicle interior blow-out air temperature) TAV blown out toward the vehicle interior are connected to an input side of the control devices.

Furthermore, an operation panel (illustration is omitted), which is arranged near a dashboard panel at the front part in the vehicle interior, is connected to the input side of the control device, and operation signals output from various operation switches mounted on the operation panel are input to the control device. The various operation switches provided on the operation panel specifically include an air-conditioning switch (A/C switch) for setting whether cooling of the air blown to the vehicle interior is performed in the inside air conditioning unit 30, and a temperature setting switch for setting a set temperature of the vehicle interior.

The control device is integrated with a control unit that controls the operations of the various control instruments connected to the output side of the control device, but a configuration (software and hardware) for controlling the operations of the respective control instruments constitutes a control unit that controls the operations of the respective control instruments.

For example, a configuration that controls an electric motor of the compressor 11 constitutes a part of a discharging performance control unit, a configuration that controls the first expansion valve 14 constitutes a first throttle control unit, a configuration that controls the second expansion valve 19 constitutes a second throttle control unit, and a configuration that controls first and second opening-and-closing valves 17, 23 constitutes a flow channel switch control unit.

Subsequently, the operation of the vehicle air conditioning apparatus 1 of the present embodiment having the above-mentioned configurations will be described. In the vehicle air conditioning apparatus 1 of the present embodiment, as described above, the mode can be switched among the cooling mode for cooling the vehicle interior, the heating mode for heating the vehicle interior, and the dehumidification heating mode for heating and dehumidifying the vehicle interior. Solid arrows in FIG. 1 indicate the heating mode. In the heating mode, the control device opens the second refrigerant passage 16 by the first opening-and-closing valve 17, and closes (blocks) the bypass passage 22 by the second opening-and-closing valve 23. In addition, the control device closes (fully closes) the third refrigerant passage 18 by the second expansion valve 19. Hollow arrows in FIG. 1 indicate the cooling mode. In the cooling mode, the control device closes the second refrigerant passage 16 by the first opening-and-closing valve 17, and closes the bypass passage 22 by the second opening-and-closing valve 23. In addition, the first refrigerant passage 13 is brought into the fully opened state by the first expansion valve 14. Hollow horizontal stripe arrows in FIG. 1 indicate the first dehumidification heating mode. In the first dehumidification heating mode, the control device closes the second refrigerant passage 16 by the first opening-and-closing valve 17, and closes the bypass passage 22 by the second opening-and-closing valve 23. The first and second expansion valves 14, 19 are brought into the throttled state or the fully opened state. Hollow diagonally hatched arrows in FIG. 1 indicate the second dehumidification heating mode. In the second dehumidification heating mode, the control device opens the second refrigerant passage 16 by the first opening-and-closing valve 17, and opens the bypass passage 22 by the second opening-and-closing valve 23. The first and second expansion valves 14, 19 are brought into the throttled state, respectively.

Subsequently, a specific piping connection structure in the refrigeration cycle device 10 will be described with reference to FIG. 2.

A first inlet side connector 50 is connected to the inlet side of the first opening-and-closing valve 17, and a first outlet side connector 51 is connected to the outlet side of the first opening-and-closing valve 17.

The first inlet side connector 50 includes three refrigerant ports, and constitutes a branching portion of the third refrigerant passage 18 from the second refrigerant passage 16. Therefore, three refrigerant ports of the first inlet side connector 50 include one refrigerant inlet port and remaining two refrigerant outlet ports. In other words, the first inlet side connector 50 constitutes a refrigerant passage coupling member (a first flow channel coupling member) for coupling the second refrigerant passage 16 and the third refrigerant passage 18.

A refrigerant inlet port of the first inlet side connector 50 is connected to an outlet port of the outside heat exchanger 15 via refrigerant piping, which is not illustrated. One of the two refrigerant outlet ports of the first inlet side connector 50 is connected to the refrigerant inlet port of the first opening-and-closing valve 17. The other one of the two refrigerant outlet ports of the first inlet side connector 50 is connected to an inlet port of the check valve 24 via a check valve inlet side refrigerant pipe 52 (a first piping member) and a check valve connector 53.

The other refrigerant outlet port (the refrigerant outlet port connected to the check valve 24) of the first inlet side connector 50 is arranged apart and downward from the check valve 24 in the direction of the gravitational force by 100 mm or more.

Figure 3:
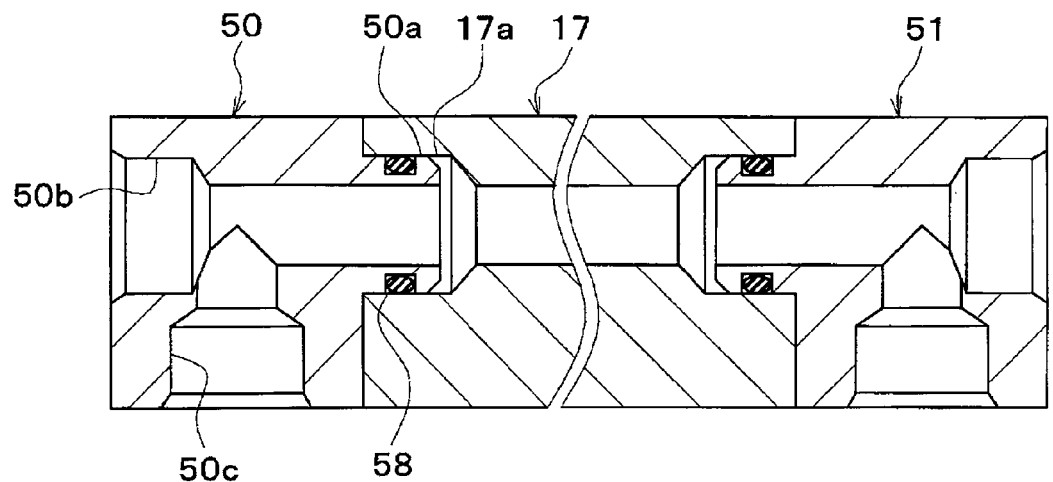
FIG. 3 is a cross-sectional view illustrating a first inlet-side connector, a first opening-and-closing valve, and a first outlet side connector according to the first embodiment.

As illustrated in FIG. 3, the first inlet side connector 50 and the first opening-and-closing valve 17 are provided with flat portions which come into abutment with each other. These flat portions are used for fastening the first inlet side connector 50 to the first opening-and-closing valve 17 with a bolt. The flat portion of the first inlet side connector 50 is provided with a male socket portion 50a formed thereon and the flat portion of the first opening-and-closing valve 17 is provided with a female socket portion 17a.

The male socket portion 50a of the first inlet side connector 50 is provided with a refrigerant outlet port, and the female socket portion 17a of the first opening-and-closing valve 17 constitutes the refrigerant inlet port. The refrigerant outlet port of the first inlet side connector 50 is connected to the refrigerant inlet port of the first opening-and-closing valve 17 by the male socket portion 50a of the first inlet side connector 50 being inserted into the female socket portion 17a of the first opening-and-closing valve 17.

An O-ring 58 is fitted on an outer periphery of the male socket portion 50a of the first inlet side connector 50. The male socket portion 50a of the first inlet side connector 50, the female socket portion 17a of the first opening-and-closing valve 17, and the O-ring 58 may be used as an example of a sealing mechanism configured to prevent the refrigerant leakage.

Two female socket portions 50b, 50c are provided on the first inlet side connector 50. The female socket portions 50b, 50c constitute the refrigerant port. An end portion of the refrigerant piping is inserted into the female socket portions 50b, 50c. Flat portions are formed on the peripheries of the female socket portions 50b, 50c. These flat portions are used for fastening the refrigerant piping to the first inlet side connector 50 with a bolt.

Figure 4:
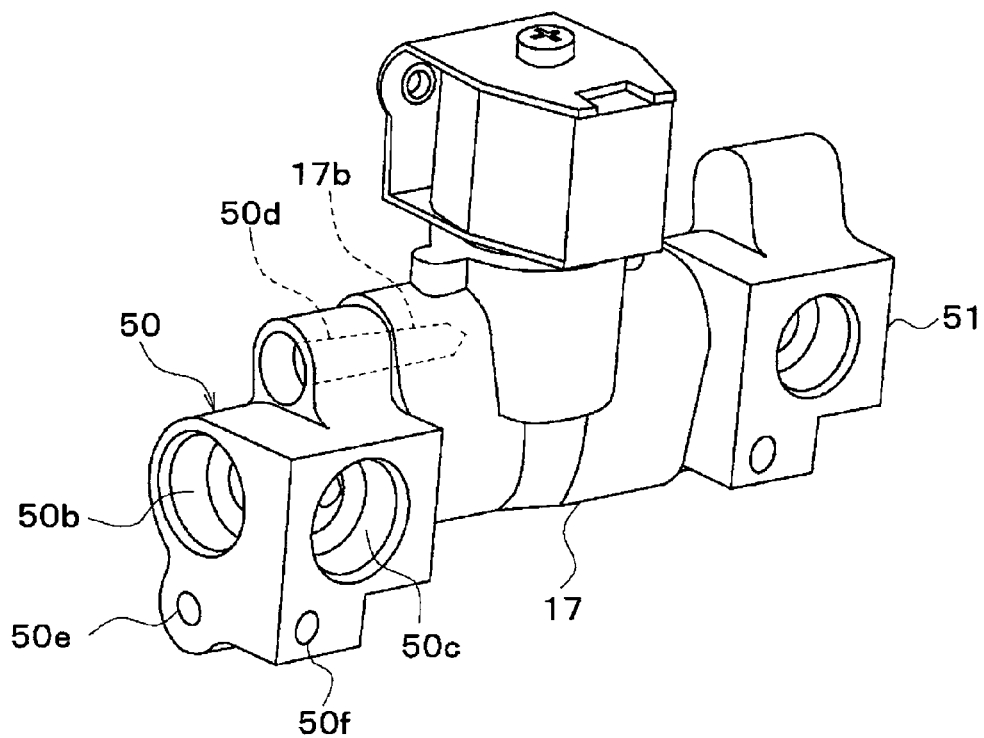
FIG. 4 is a perspective view illustrating the first inlet-side connector, the first opening-and-closing valve, and the first outlet side connector according to the first embodiment.

As illustrated in FIG. 4, the first inlet side connector 50 and the first opening-and-closing valve 17 are provided with seat surfaces for bolt fastening formed thereon, the seat surface of the first inlet side connector 50 is provided with a bolt fastening hole 50d formed therein, and the seat surface of the first opening-and-closing valve 17 is provided with a female screw hole 17b for bolt fastening formed therein. The bolt fastening hole 50d is a hole for allowing passage of the bolt, and is a hole having a diameter larger than that of the bolt. The female screw hole 17b is a hole in which a female screw with which the bolt engages is cut.

The flat portions in the peripheries of the female socket portions 50b, 50c are provided with female screw holes 50e, 50f for fastening the refrigerant piping to the first inlet side connector 50 formed therein with a bolt.

Figure 2:
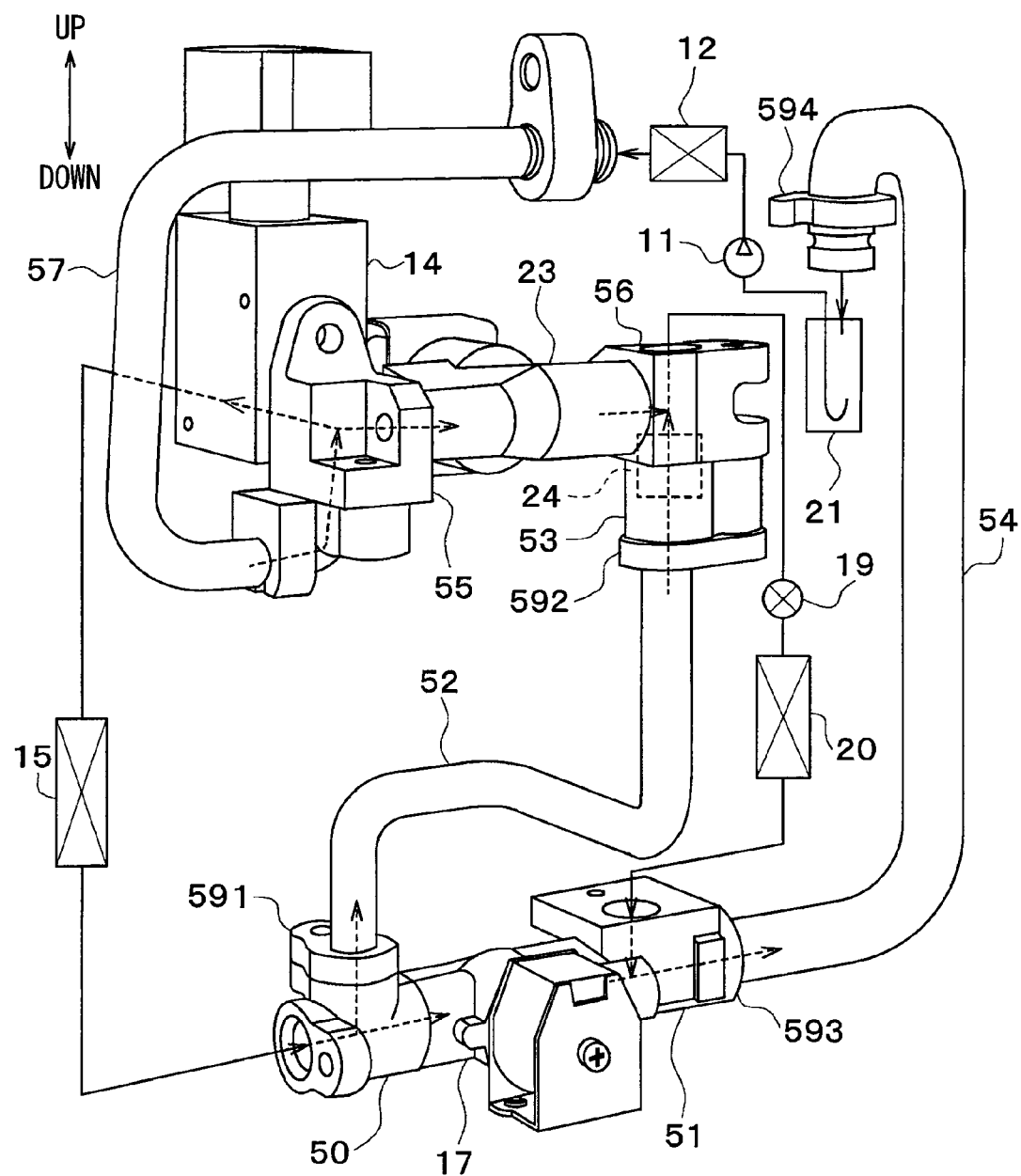
FIG. 2 is a schematic perspective view illustrating a piping connection structure of a refrigeration cycle device according to the first embodiment.

As illustrated in FIG. 2, the first outlet side connector 51 includes three refrigerant ports, and constitutes a joining portion of the third refrigerant passage 18 to the second refrigerant passage 16. Therefore, the three refrigerant ports of the first outlet side connector 51 include two refrigerant inlet ports and remaining one refrigerant outlet port. In other words, the first outlet side connector 51 constitutes a refrigerant passage coupling member (a third flow channel coupling member) for coupling the second refrigerant passage 16 and the third refrigerant passage 18.

One of the two refrigerant inlet ports of the first outlet side connector 51 is connected to the refrigerant outlet port of the first opening-and-closing valve 17. The other one of the two refrigerant inlet ports of the first outlet side connector 51 is connected to the outlet port of the inside evaporator 20 via refrigerant piping, which is not illustrated. The refrigerant outlet port of the first outlet side connector 51 is connected to the inlet port of the accumulator 21 via the accumulator inlet-side refrigerant pipe 54 (a second piping member).

As illustrated in FIG. 3, the structure of the first outlet side connector 51 is the same as that of the first inlet side connector 50. Therefore, description about the structure of the first outlet side connector 51 will be omitted.

As illustrated in FIG. 2, a second inlet side connector 55 is connected to the inlet side of the second opening-and-closing valve 23, and a second outlet side connector 56 is connected to the outlet side of the second opening-and-closing valve 23.

The second inlet side connector 55 includes three refrigerant ports, and constitutes a branching portion of the bypass passage 22 from the first refrigerant passage 13. Therefore, the three refrigerant ports of the second inlet side connector 55 include one refrigerant inlet port and remaining two refrigerant outlet ports. In other words, the second inlet side connector 55 constitutes a refrigerant passage coupling member (a fourth flow channel coupling member) configured to couple the first refrigerant passage 13 and the bypass passage 22.

The refrigerant inlet port of the second inlet side connector 55 is connected to the exit port of the inside condenser 12 via an interior condenser outlet side refrigerant pipe 57. One of the two refrigerant outlet ports of the second inlet side connector 55 is connected to the refrigerant inlet port of the second opening-and-closing valve 23. The other one of the two refrigerant outlet ports of the second inlet side connector 55 is connected to the inlet port of the first expansion valve 14. The second inlet side connector 55 is fastened to the first expansion valve 14 with a bolt.

The structure of the second inlet side connector 55 is the same as those of the first inlet side connector 50 and the first outlet side connector 51. Therefore, description about the structure of the second inlet side connector 55 will be omitted.

The second outlet side connector 56 has three refrigerant ports, and constitutes the joining portion of the bypass passage 22 to the third refrigerant passage 18. Therefore, the three refrigerant ports of the second outlet side connector 56 include two refrigerant inlet ports and remaining one refrigerant outlet port.

In this example, the second outlet side connector 56 is coupled to the check valve connector 53. Therefore, the second outlet side connector 56 and the check valve connector 53 constitute a refrigerant passage coupling member (a second flow channel coupling member) configured to couple the bypass passage 22 and the third refrigerant passage 18.

One of the two refrigerant inlet ports of the second outlet side connector 56 is connected to the refrigerant outlet port of the second opening-and-closing valve 23. The other one of the two refrigerant inlet ports of the second outlet side connector 56 is coupled to the refrigerant outlet port of the check valve 24. The refrigerant outlet port of the second outlet side connector 56 is connected to the inlet port of the second expansion valve 19 via the refrigerant piping, which is not illustrated.

Figure 5:
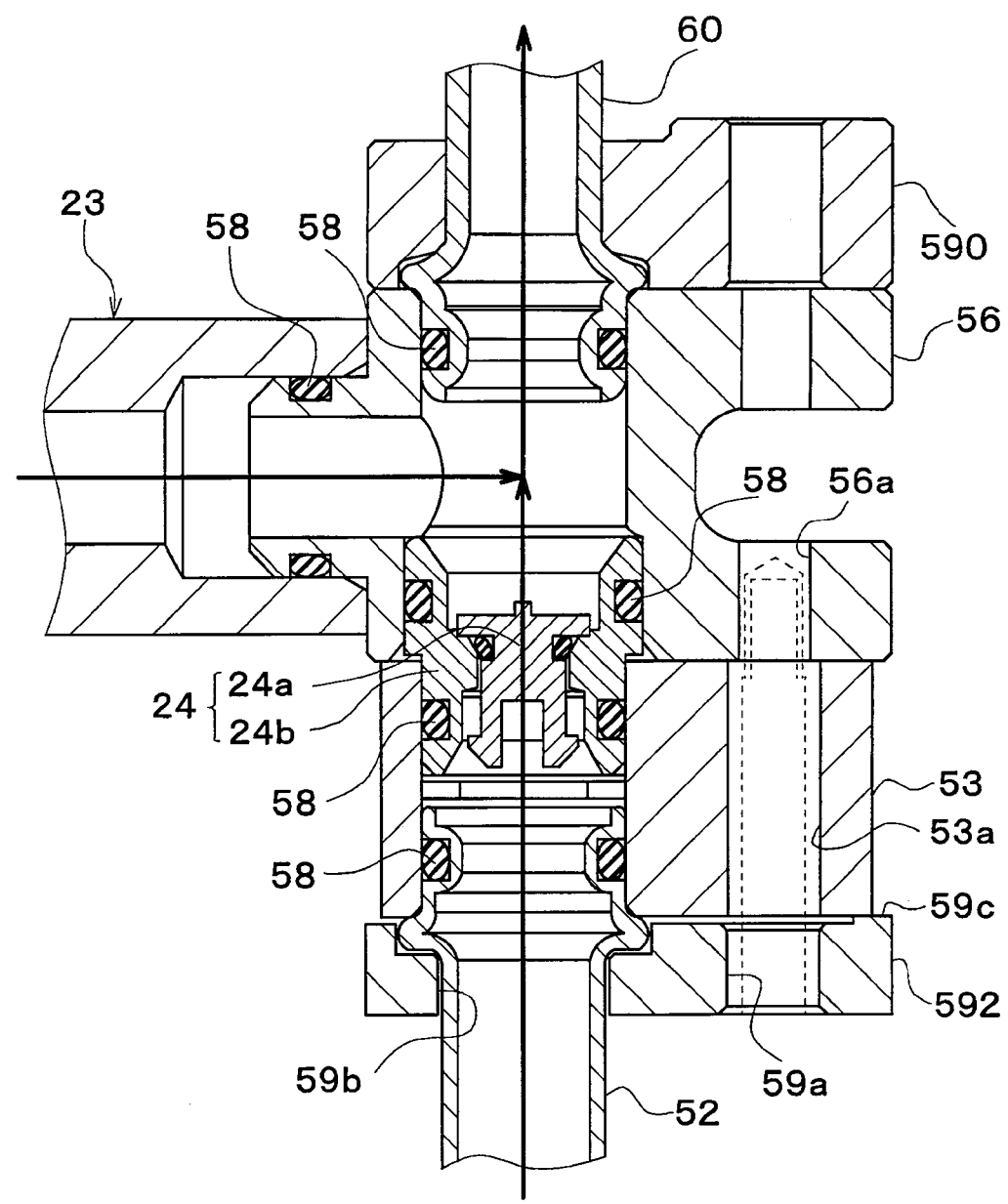
FIG. 5 is a cross-sectional view illustrating a second opening-and-closing valve, a second outlet side connector, and a check valve connector according to the first embodiment.
Figure 6:
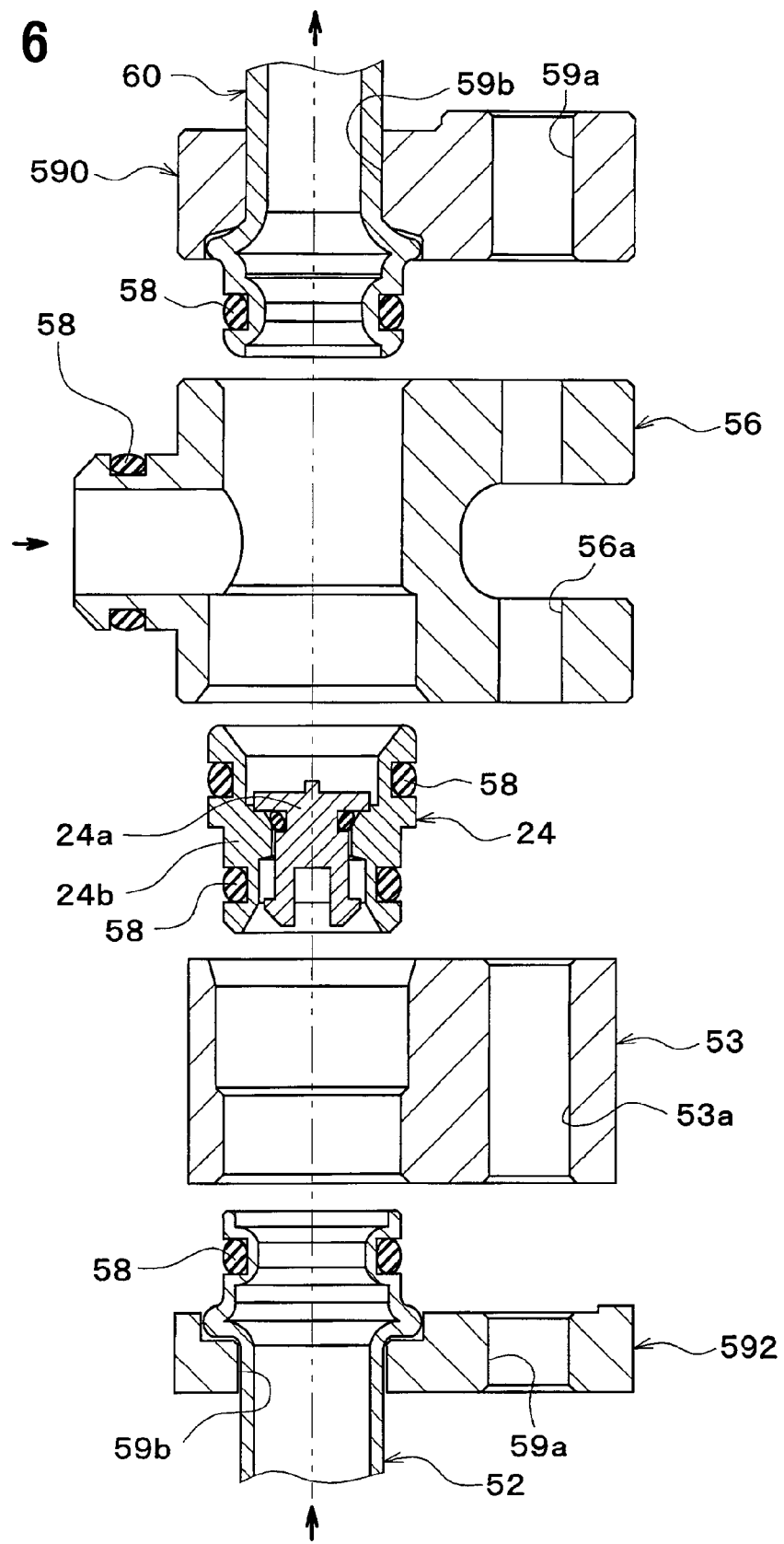
FIG. 6 is an exploded cross-sectional view illustrating the second opening-and-closing valve, the second outlet side connector, and the check valve connector according to the first embodiment.

As illustrated in FIG. 5 and FIG. 6, the structure of the second outlet side connector 56 is the same as those of the first inlet side connector 50, the first outlet side connector 51, and the second inlet side connector 55. Therefore, description about the structure of the second outlet side connector 56 will be omitted.

The check valve 24 includes a valve body member 24a and a valve body storage member 24b. The valve body storage member 24b is formed into a cylindrical shape, and both ends thereof are formed into male socket portions. One of the male socket portions is inserted into the female socket portion of the second outlet side connector 56. The other male socket portion is inserted into the female socket portion of the check valve connector 53.

The check valve connector 53 is provided with two female socket portions so as to face opposite to each other. One of the female socket portions constitutes the refrigerant inlet port, and the other female socket portion constitutes a refrigerant outlet port. A male socket portion of the valve body storage member 24b is inserted into one of the female socket portions. A check valve inlet side refrigerant pipe 52 is inserted into the other female socket portion.

The o-rings 58 are arranged between the male socket portions and the female socket portions respectively, whereby a sealing mechanism which prevents the refrigerant leakage is achieved.

One end of the check valve inlet side refrigerant pipe 52 is fixed to the check valve connector 53 by using a fastening plate 592 (a second fixing member). The fastening plate 592, the check valve connector 53, and the second outlet side connector 56 are provided with flat portions which abut against each other. These flat portions are used for fastening the fastening plate 592, the check valve connector 53, and the second outlet side connector 56 with each other by using one bolt.

The fastening plate 592 and the check valve connector 53 are provided with bolt fastening holes 59a, 53a, and a female screw hole 56a for bolt fastening is formed in the second outlet side connector 56. The bolt fastening holes 59a, 53a are holes for allowing passage of the bolt, and are holes having a diameter larger than that of the bolt. The female screw hole 56a is a hole in which a female screw with which the bolt engages is cut.

The fastening plate 592 is assembled in advance to the check valve inlet side refrigerant pipe 52 before inserting the check valve inlet side refrigerant pipe 52 into the check valve connector 53. Specifically, after the check valve inlet side refrigerant pipe 52 has been inserted into a pipe insertion hole 59b of the fastening plate 592, a portion in the vicinity of the end of the check valve inlet side refrigerant pipe 52 is bulged, whereby the fastening plate 592 is assembled to the check valve inlet side refrigerant pipe 52.

An inner diameter of the pipe insertion hole 59b of the fastening plate 592 is slightly larger than an outer diameter of the check valve inlet side refrigerant pipe 52. Therefore, a gap is formed between an outer peripheral surface of the check valve inlet side refrigerant pipe 52 and an inner peripheral surface of the fastening plate 592.

The thickness of the fastening plate 592 is thinner than a predetermined thickness. An end of the bolt fastening hole 59a of the fastening plate 592 is provided with a shouldered portion 59c so as to be increased in thickness toward the check valve connector 53. Accordingly, when the fastening plate 592 is fastened to the check valve connector 53 with a bolt, a portion on the side of the pipe insertion hole 59b of the fastening plate 592 apart from the bolt fastening hole 59a comes into tight contact with the check valve connector 53.

In the same manner, one end portion of an expansion valve inlet side refrigerant pipe 60 is fixed to the second outlet side connector 56 by using a fastening plate 590.

In the same manner, as illustrated in FIG. 2, the other end portion of the check valve inlet side refrigerant pipe 52 is fixed to the first inlet side connector 50 by using a fastening plate 591 (a first fixing member). In the same manner, one end of the accumulator inlet-side refrigerant pipe 54 is fixed to the first outlet side connector 51 by using a fastening plate 593 (a third fixing member), and the other end of the accumulator inlet-side refrigerant pipe 54 is fixed to the accumulator 21 by using a fastening plate 594 (a fourth fixing member). A gap is formed between the outer peripheral surface of the accumulator inlet-side refrigerant pipe 54 and the inner peripheral surface of the fastening plate 594.

The first opening-and-closing valve 17, the first inlet side connector 50, and the first outlet side connector 51 constitute a first module. The second opening-and-closing valve 23, the second inlet side connector 55, the second outlet side connector 56, the first expansion valve 14, the check valve 24, and the check valve connector 53 constitute a second module. The first modules 17, 50, 51 and the second modules 23, 55, 56, 14, 24, 53 are coupled to each other via the check valve inlet side refrigerant pipe 52.

In the piping connection structure as described above, the refrigerant flowing out of the inside condenser 12 is capable of branching in the interior of the second inlet side connector 55 to the first expansion valve 14 and to the second opening-and-closing valve 23.

The refrigerant flowing out of the second opening-and-closing valve 23 is allowed to join the refrigerant passed through the check valve 24 and flow toward the second expansion valve 19 in the interior of the second outlet side connector 56.

The refrigerant flowing out of the outside heat exchanger 15 is capable of branching in the interior of the first inlet side connector 50 to the check valve 24 and to the first opening-and-closing valve 17.

The refrigerant flowing out of the first opening-and-closing valve 17 is allowed to join the refrigerant passed through the inside evaporator 20 and flow toward the accumulator 21 in the interior of the first outlet side connector 51.

Figure 7:
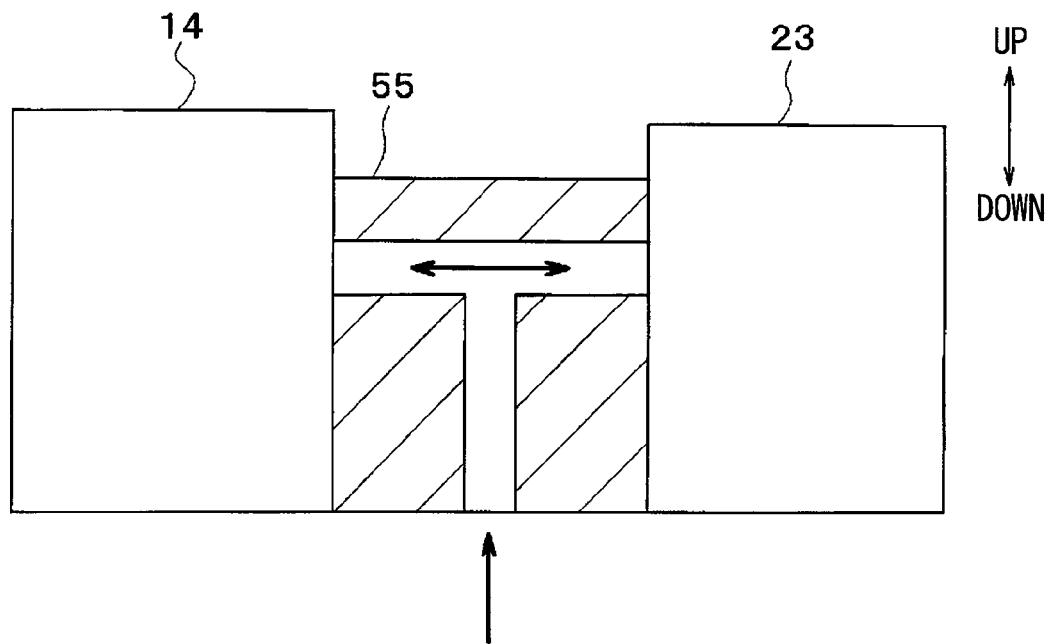
FIG. 7 is a schematic cross-sectional view illustrating a second inlet side connector, a first expansion valve, and the second opening-and-closing valve according to the first embodiment.

As illustrated in FIG. 7, in the second inlet side connector 55, the refrigerant flow channel toward the first expansion valve 14 and the refrigerant flow channel toward the second opening-and-closing valve 23 extend in the horizontal direction. Therefore, the refrigerant can be uniformly distributed to the first expansion valve 14 and the second opening-and-closing valve 23.

According to the present embodiment, since the refrigerant ports of the opening-and-closing valves 17, 23 are directly connected to the refrigerant ports of the connectors 50, 51, 55, 56, no refrigerant piping is required between the opening-and-closing valve and the connector. Therefore, an occupied space within the vehicle can be reduced and the number of components may be reduced.

Since the refrigerant piping is not required between the opening-and-closing valve and the connector, a pressure loss of the refrigerant may be reduced and hence the cooling performance and the heating performance can be improved.

Since the refrigerant piping is not necessary between the opening-and-closing valve and the connector, the capacity of the refrigerant flow channel can be reduced as the entire cycle. Therefore, the sealed amounts of the refrigerant and the refrigerant oil may be reduced. The refrigerant oil has a role to lubricate the compressor, is mixed into the refrigerant and circulates in the cycle.

A seal mechanism including a male socket portion, a female socket portion, and an O-ring is provided at the flow channel connecting portion between the opening-and-closing valve and the connector, and the connector has a portion that is different in position from the sealing mechanism and is fixed to the opening-and-closing valve with a bolt. Therefore, even though a crack occurs at the fixing portion between the opening-and-closing valve and the connector, the refrigerant leakage may be prevented by the sealing mechanism.

Since the refrigerant outlet port of the second inlet side connector 55 is directly connected to the refrigerant inlet port of the first expansion valve 14, no refrigerant piping is required between the first expansion valve 14 and the second inlet side connector 55. Therefore, the occupied space within the vehicle can be reduced and the number of components may be reduced. The pressure loss of the refrigerant can be reduced and hence the cooling performance and the heating performance can be improved.

One end of the check valve inlet side refrigerant pipe 52 is fixed to the check valve connector 53 by using the fastening plate 592, and the other end of the check valve inlet side refrigerant pipe 52 is fixed to the first inlet side connector 50 by using the fastening plate 591. Therefore, the first modules 17, 50, 51 and the second modules 23, 55, 56, 14, 24, 53 may be coupled with a bolt. Therefore, even though a crack occurs at the fixing portions between the respective modules and the check valve inlet side refrigerant pipe 52, the refrigerant leakage can be prevented by the sealing mechanism.

The other end of the accumulator inlet-side refrigerant pipe 54 is fixed to the accumulator 21 by using the fastening plate 594, the accumulator inlet-side refrigerant pipe 54 and the accumulator 21 can be coupled with a bolt. Therefore, even though a crack occurs at the fixing portion between the accumulator 21 and the accumulator inlet-side refrigerant pipe 54, the refrigerant leakage can be prevented by the sealing mechanism.

The refrigerant outlet port, which is one of the three refrigerant ports of the first inlet side connector 50 and is connected to the check valve 24, is arranged apart from the check valve 24 downward in the direction of the gravitational force by 100 mm or more. Therefore, accumulation of the refrigerant and the refrigerant oil at a specific portion is prevented.

In other words, when the first opening-and-closing valve 17 is opened, the refrigerant and the refrigerant oil which are to flow toward the accumulator 21 may flow toward the check valve 24 due to an inertia force of the refrigerant and the refrigerant oil or turbulence of the flow at the branching portion of the first opening-and-closing valve 17. If the refrigerant and the refrigerant oil flowed toward the check valve 24 are accumulated on the downstream side (the upper side in FIG. 2) of the check valve 24, an operation with insufficient refrigerant or an operation with insufficient refrigerant oil may result, so that the insufficient performance or failure of the refrigerator may result.

In contrast, in the present embodiment, since the check valve 24 is arranged apart from the refrigerant outlet port of the first inlet side connector 50 upward in the direction of the gravitational force by 100 mm, the refrigerant and the refrigerant oil drop by the action of the gravitational force before reaching the downstream side of the check valve 24. Therefore, the refrigerant and the refrigerant oil are prevented from being accumulated on the downstream side of the check valve 24 (accumulation of the refrigerant and the refrigerant oil at a specific portion).

The thickness of the fastening plates 590 to 594 is smaller than a predetermined thickness, and a gap is provided between the inner peripheral surfaces of the fastening plates 590 to 594 and the outer peripheral surface of the refrigerant piping. Therefore, the connecting portion of the refrigerant piping may be prevented from being broken due to freezing. The reason will be described below.

When a low-pressure refrigerant at 0° C. or below (subzero) flows to the refrigerant piping connecting portion, moisture in the atmospheric air builds up condensation and is frozen between a male socket and a female socket.

If the thickness of the fastening plates 590 to 594 is large, even when the operation of the refrigeration cycle stops, defrosting can hardly occur, and ice can easily grow. Consequently, the refrigerant piping is deformed, and a crack may occur, and hence the refrigerant leakage may occur.

In contrast, in the present embodiment, since the thickness of the fastening plates 590 to 594 is small, ice can be prevented from growing. Even though ice grows, since the gap is formed between the inner peripheral surfaces of the fastening plates 590 to 594 and the outer peripheral surface of the refrigerant piping, the ice can be released toward the atmospheric open side (the outer portion on the atmospheric air side) from the gap. Therefore, deformation of the refrigerant piping can be restricted.

(Second Embodiment)

Figure 8:
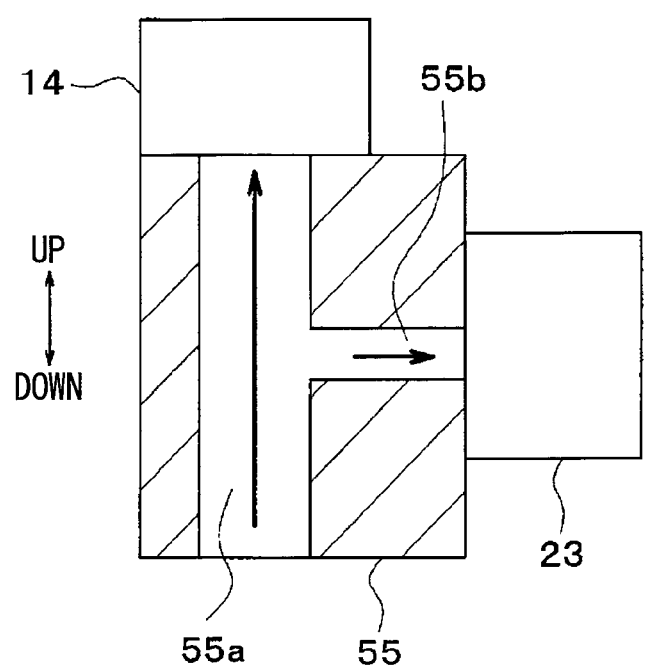
FIG. 8 is a schematic cross-sectional view illustrating a second inlet side connector, a first expansion valve, and a second opening-and-closing valve according to a second embodiment of the present disclosure.

In the first embodiment described above, the refrigerant flow channel toward the first expansion valve 14 and the refrigerant flow channel toward the second opening-and-closing valve 23 extend in the horizontal direction in the second inlet side connector 55. In a second embodiment, however, as illustrated in FIG. 8, in the second inlet side connector 55, a first refrigerant flow channel 55a leading from the refrigerant inlet port to the refrigerant outlet port connected to the first expansion valve 14 extends to an upper side in the direction of the gravitational force from a lower side in the direction of the gravitational force, and a second refrigerant flow channel 55b branching from the first refrigerant flow channel 55a to the refrigerant outlet port connected the second opening-and-closing valve 23 extends in the horizontal direction.

In this configuration, in the case where the refrigerant flow rate is a low flow rate, the liquid-phase refrigerant branching to the second opening-and-closing valve 23 can be restricted from being reduced by the action of the gravitational force. In this case, the liquid-phase refrigerant branching toward the second opening-and-closing valve 23 may be reduced, but a gas-phase refrigerant may branch to the second opening-and-closing valve 23.

(Third Embodiment)

Figure 9:
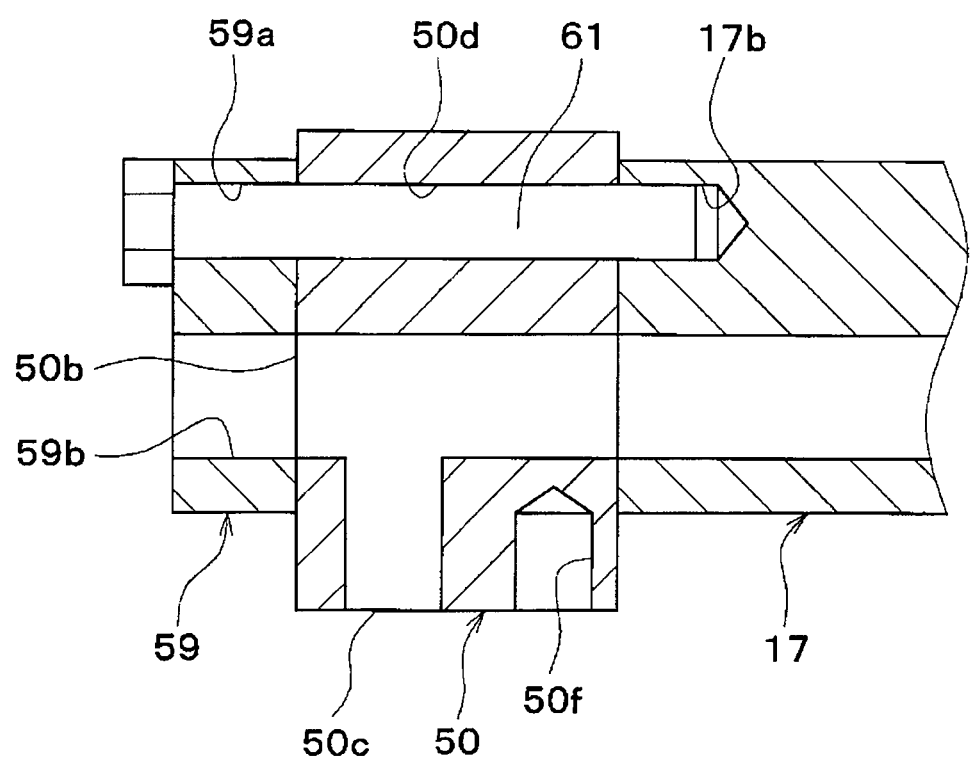
FIG. 9 is a cross-sectional view illustrating a first inlet-side connector, a first opening-and-closing valve, and a first outlet side connector according to a third embodiment of the present disclosure.

In the first embodiment, the first inlet side connector 50 and the first opening-and-closing valve 17 are fastened with the bolt, and the first inlet side connector 50 and the fastening plate 591 are fastened with another bolt. In a third embodiment, however, as illustrated in FIG. 9, the first inlet side connector 50, the first opening-and-closing valve 17, the fastening plate 591 are fastened with a single bolt 61. Accordingly, the number of components may be reduced, and the number of assembling steps may be reduced.

(Fourth Embodiment)

Figure 10:
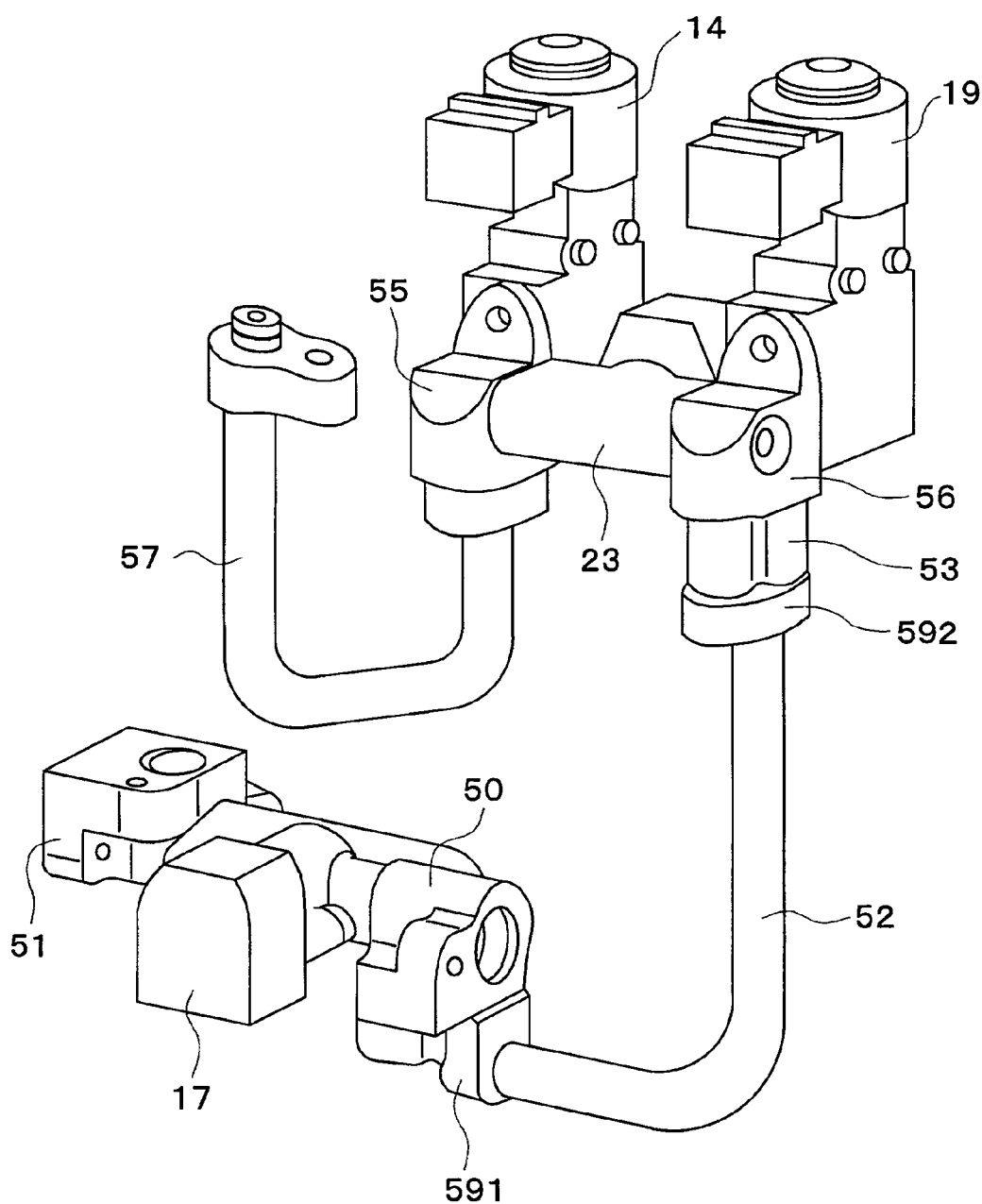
FIG. 10 is a perspective view illustrating a piping connection structure of a refrigeration cycle device according to a fourth embodiment of the present disclosure.

In the first embodiment described above, the refrigerant outlet port of the second outlet side connector 56 is connected to the refrigerant inlet port of the second expansion valve 19 via the refrigerant piping. In the present embodiment, however, as illustrated in FIG. 10, the refrigerant outlet port of the second outlet side connector 56 is directly connected to the refrigerant inlet port of the second expansion valve 19. The second outlet side connector 56 is fastened to the second expansion valve 19 with a bolt.

In this configuration, no refrigerant piping is required also between the second expansion valve 19 and the second outlet side connector 56. Therefore, the occupied space within the vehicle can be reduced and the number of components may be reduced. In addition, since the pressure loss of the refrigerant may be reduced, the cooling performance and the heating performance may be improved.

(Fifth Embodiment)

In the embodiments described above, the sealing mechanism includes the O-ring 58 and the like. In the present embodiment, however, as illustrated in FIG. 11 to FIG. 14, a gasket seal 65 may be used as an example of the sealing mechanism.

Figure 11:
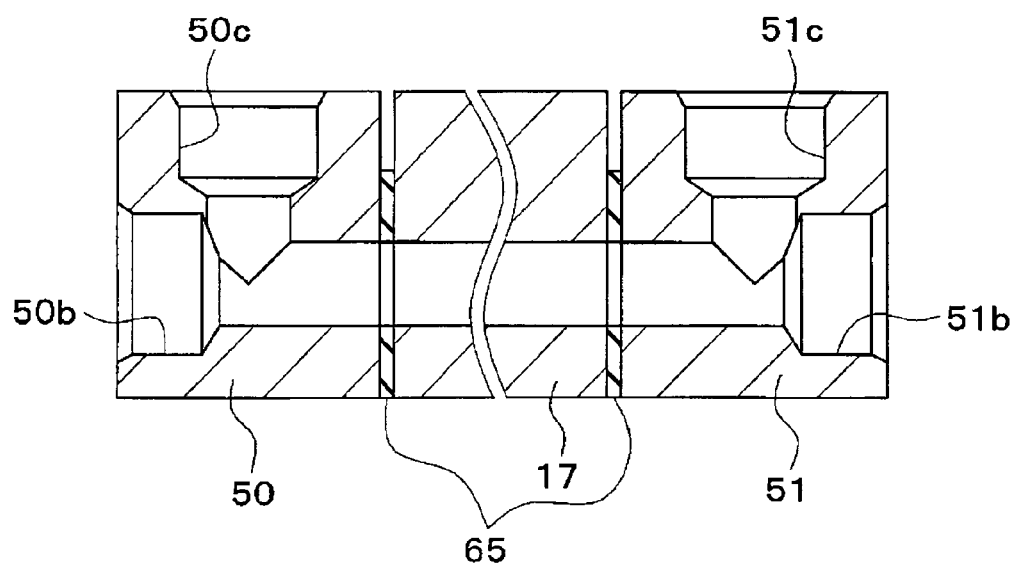
FIG. 11 is a cross-sectional view illustrating a first inlet-side connector, a first opening-and-closing valve, and a first outlet side connector according to a fifth embodiment of the present disclosure.

As illustrated in FIG. 11, the first opening-and-closing valve 17 is interposed between the first inlet side connector 50 and the first outlet side connector 51.

The first inlet side connector 50 and the first opening-and-closing valve 17 are provided with flat portions which come into abutment with each other. These flat portions are used for interposing the gasket seal 65 between the first inlet side connector 50 and the first opening-and-closing valve 17. The flat portion of the first inlet side connector 50, which is one of the flat portions coming into abutment with each other, is provided with a refrigerant outlet port. The flat portion of the first opening-and-closing valve 17, which is another of the flat portions coming into abutment with each other, is provided with a refrigerant inlet port.

In the same manner, the first outlet side connector 51 and the first opening-and-closing valve 17 are provided with flat portions which come into abutment with each other. These flat portions are used for interposing the gasket seal 65 between the first outlet side connector 51 and the first opening-and-closing valve 17. The flat portion of the first outlet side connector 51, which is one of the flat portions coming into abutment with each other, is provided with a refrigerant inlet port. The flat portion of the first openingand-closing valve 17, which is another of the flat portions coming into abutment with each other, is provided with a refrigerant outlet port.

Figure 12:
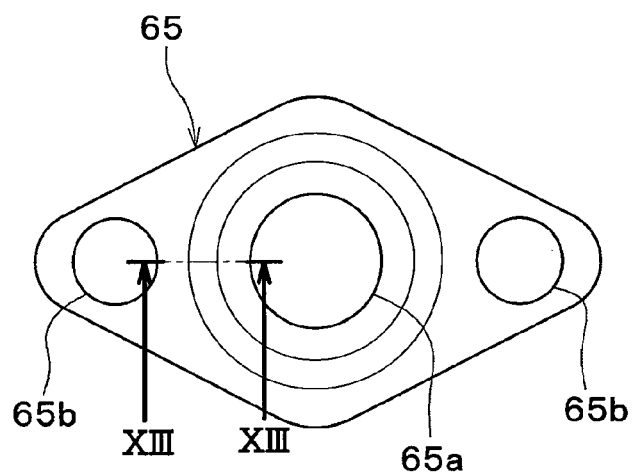
FIG. 12 is a top view illustrating a gasket seal according to the fifth embodiment.
Figure 13:
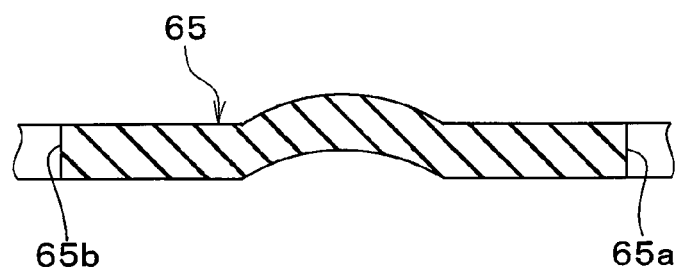
FIG. 13 is a cross-sectional view taken along a line XIII-XIII in FIG. 12.

The gasket seal 65 is used as an example of the sealing mechanism configured to prevent the refrigerant leakage. The gasket seal 65 is formed of rubber or a resin. As illustrated in FIG. 12 and FIG. 13, a refrigerant circulation hole 65a and a bolt through hole 65b are formed on the gasket seal 65. As illustrated in FIG. 13, the gasket seal 65 is provided with a portion swelled so as to surround the refrigerant circulation hole 65a.

The refrigerant circulation hole 65a is a hole which allows the refrigerant to flow therethrough, and communicates with the refrigerant ports formed in the first inlet side connector 50, the first opening-and-closing valve 17, and the first outlet side connector 51. The bolt through hole 65b is a hole through which a through bolt (which is not illustrated) for fastening the first inlet side connector 50, the first opening-and-closing valve 17, and the first outlet side connector 51 penetrates.

Figure 14:
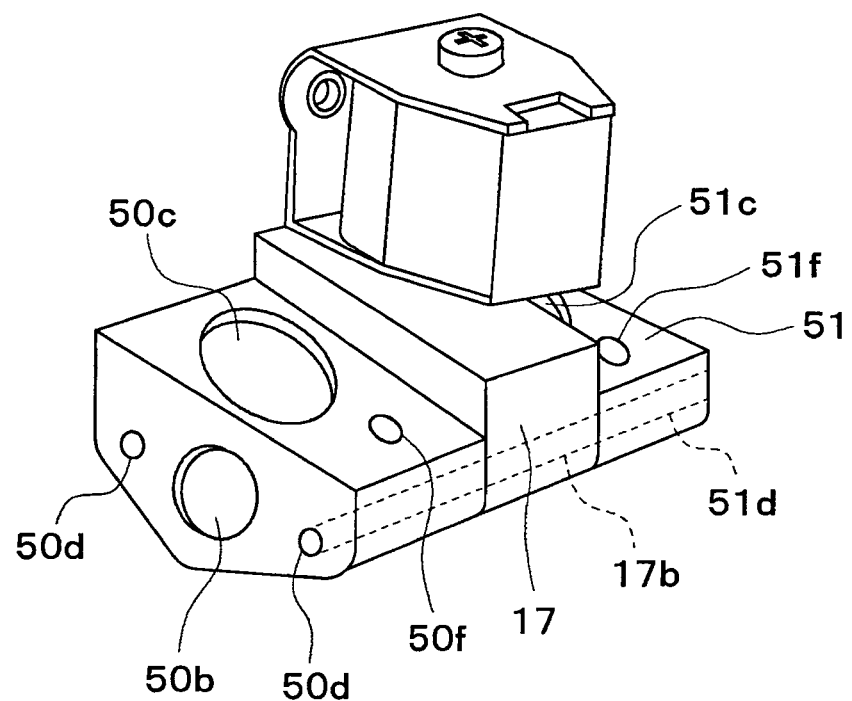
FIG. 14 is a perspective view illustrating the first inlet-side connector, the first opening-and-closing valve, and the first outlet side connector according to the fifth embodiment.

As illustrated in FIG. 11 and FIG. 14, the first inlet side connector 50 is provided with two female socket portions 50b, 50c formed thereon. The female socket portions 50b, 50c constitute the refrigerant port. An end portion of the refrigerant piping is inserted into the female socket portions 50b, 50c.

The first outlet side connector 51 is provided with two female socket portions 51b, 51c formed thereon. The female socket portions 51b, 51c constitute the refrigerant port. An end portion of the refrigerant piping is inserted into the female socket portions 51b, 51c.

One female socket portion 50b of the first inlet side connector 50 and one female socket portion 51b of the first outlet side connector 51 are opened toward the direction of arrangement of the first inlet side connector 50, the first opening-and-closing valve 17, and the first outlet side connector 51 (the lateral direction in FIG. 11).

Flat portions are formed in the peripheries of the female socket portions 50b, 50c of the first inlet side connector 50. These flat portions are used for fastening the refrigerant piping to the first inlet side connector 50 with a bolt.

In the same manner, flat portions are provided on the peripheries of the female socket portions 51b, 51c of the first outlet side connector 51. These flat portions are used for fastening the refrigerant piping to the first outlet side connector 51 with a bolt.

As illustrated in FIG. 14, a bolt fastening hole 50d is formed in the first inlet side connector 50, a bolt fastening hole 17b is formed in the first opening-and-closing valve 17, and a bolt fastening hole 51d is formed in the first outlet side connector 51.

These bolt fastening holes 50d, 17b, 51d are holes for fastening the first inlet side connector 50, the first opening-and-closing valve 17, and the first outlet side connector 51 with a through bolt, and are arranged coaxially with each other.

Although the illustration is omitted, the refrigerant piping to be connected to the female socket portion 50b of the first inlet side connector 50 and the refrigerant piping to be connected to the female socket portion 51 b of the first outlet side connector 51 are also fastened with a through bolt for fastening the first inlet side connector 50, the first opening-and-closing valve 17, and the first outlet side connector 51.

The flat portion in the periphery of the female socket portion 50c of the first inlet side connector 50 is formed with a female screw hole 50f for fastening the refrigerant piping to the first inlet side connector 50 with a bolt. The flat portion in the periphery of the female socket portion 51c of the first outlet side connector 51 is formed with a female screw hole 51f for fastening the refrigerant piping to the first inlet side connector 50 with a bolt.

In the present embodiment, the gasket seal 65 is used as an example of a sealing mechanism. In this configuration, since the fitting structure such as the male socket portion 50a and the female socket portion 17a in the first embodiment is not necessary, the size of the framework may be reduced.

In the present embodiment, since the first inlet side connector 50, the first opening-and-closing valve 17 and the first outlet side connector 51 are fastened with the through bolt, the structure may be simplified.

(Sixth Embodiment)

Figure 15:
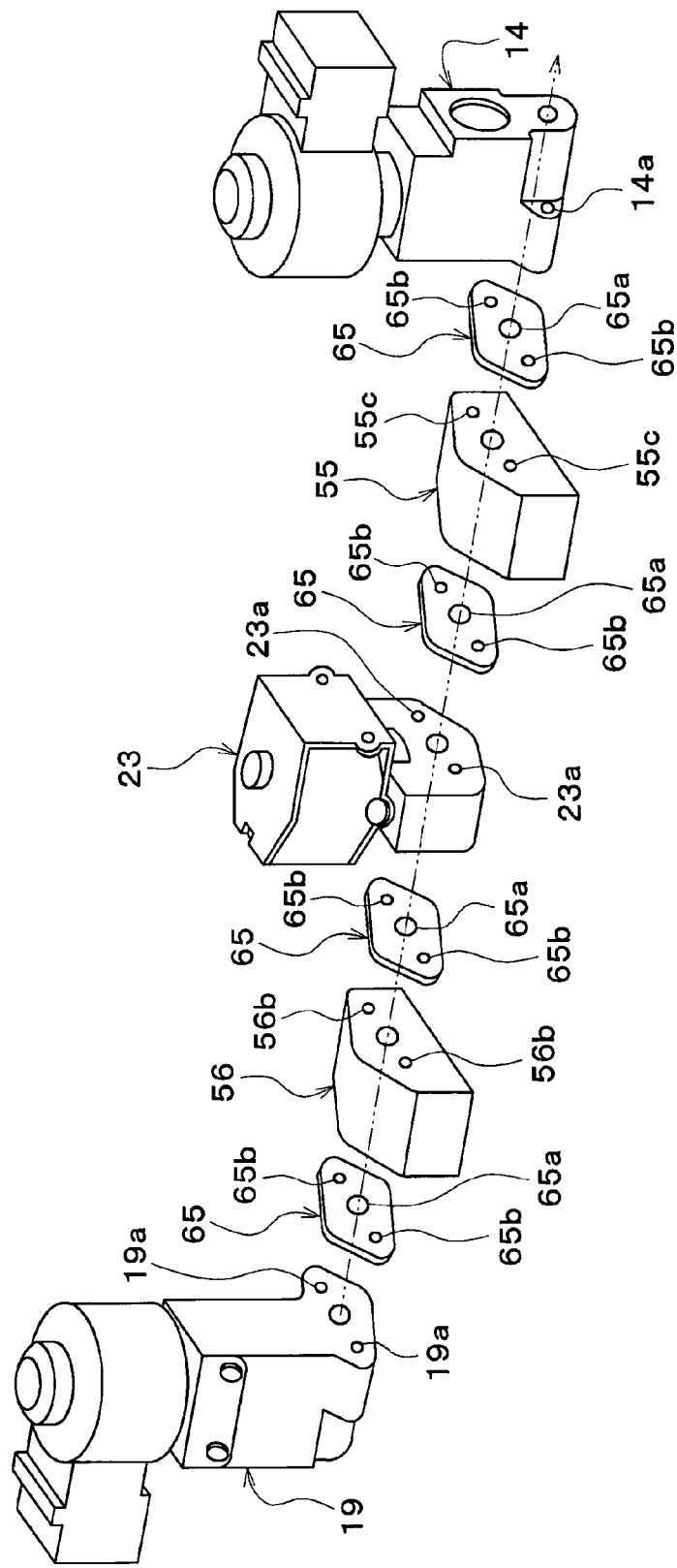
FIG. 15 is an exploded perspective view illustrating a first expansion valve, a second inlet side connector, a second opening-and-closing valve, a second outlet side connector, and a second expansion valve according to a sixth embodiment of the present disclosure.
Figure 16:
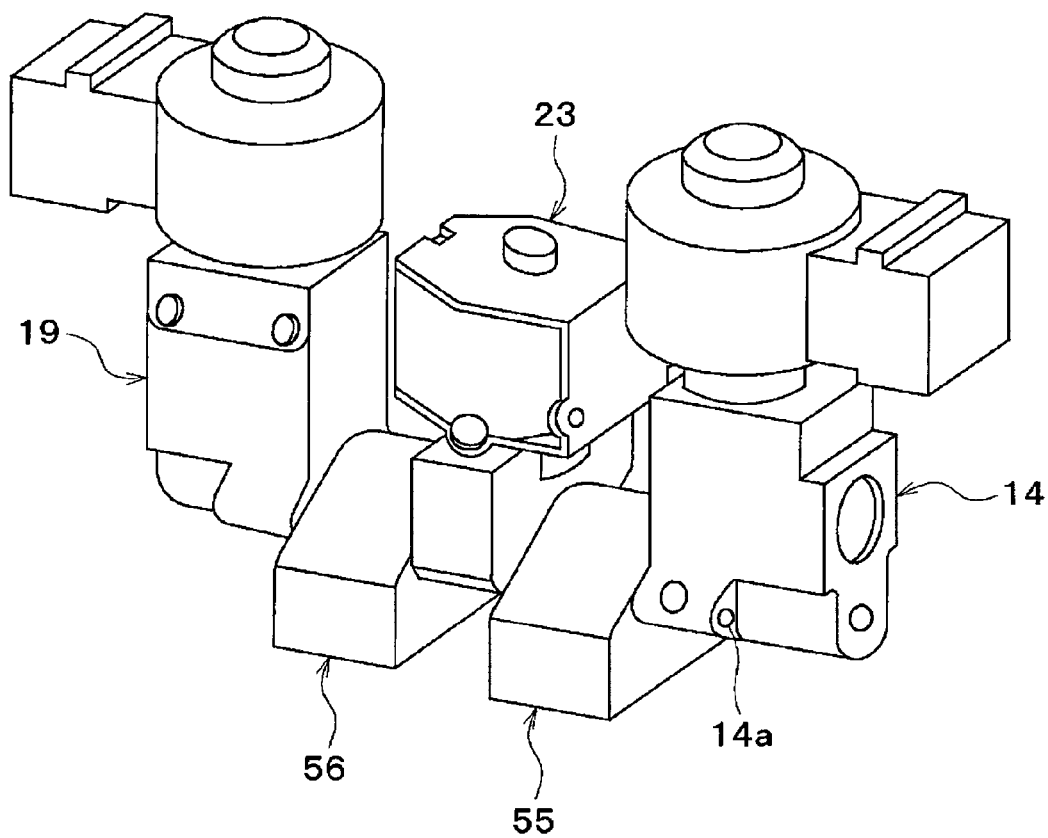
FIG. 16 is a perspective view illustrating the first expansion valve, the second inlet side connector, the second opening-and-closing valve, the second outlet side connector, and the second expansion valve according to the sixth embodiment.

In the fifth embodiment, the gasket seal 65 is used as an example of the sealing mechanism of the first inlet side connector 50, the first opening-and-closing valve 17, and the first outlet side connector 51. In the present embodiment, however, as illustrated in FIG. 15 and FIG. 16, the gasket seal 65 is provided as an example of the sealing mechanism of the first expansion valve 14, the second inlet side connector 55, the second opening-and-closing valve 23, the second outlet side connector 56, and the second expansion valve 19.

Specifically, the gasket seal 65 is interposed between the first expansion valve 14 and the second inlet side connector 55. The gasket seal 65 is also interposed between the second inlet side connector 55 and the second opening-and-closing valve 23. The gasket seal 65 is interposed between the second opening-and-closing valve 23 and the second outlet side connector 56. The gasket seal 65 is interposed also between the second outlet side connector 56 and the second expansion valve 19.

The first expansion valve 14 is provided with a bolt fastening hole 14a. The second inlet side connector 55 is provide with a bolt fastening hole 55c. The second opening-and-closing valve 23 is also provided with a bolt fastening hole 23a. The second outlet side connector 56 is also provided with a bolt fastening hole 56b. The second expansion valve 19 is also provided with a bolt fastening hole 19a.

These bolt fastening holes 14a, 55c, 23a, 56b, 19a are holes for fastening the first expansion valve 14, the second inlet side connector 55, the second opening-and-closing valve 23, the second outlet side connector 56, and the second expansion valve 19 with the through bolt and are arranged coaxially with each other.

In the present embodiment as well, the same advantageous effects as the fifth embodiment are achieved.

(Seventh Embodiment)

Figure 17:
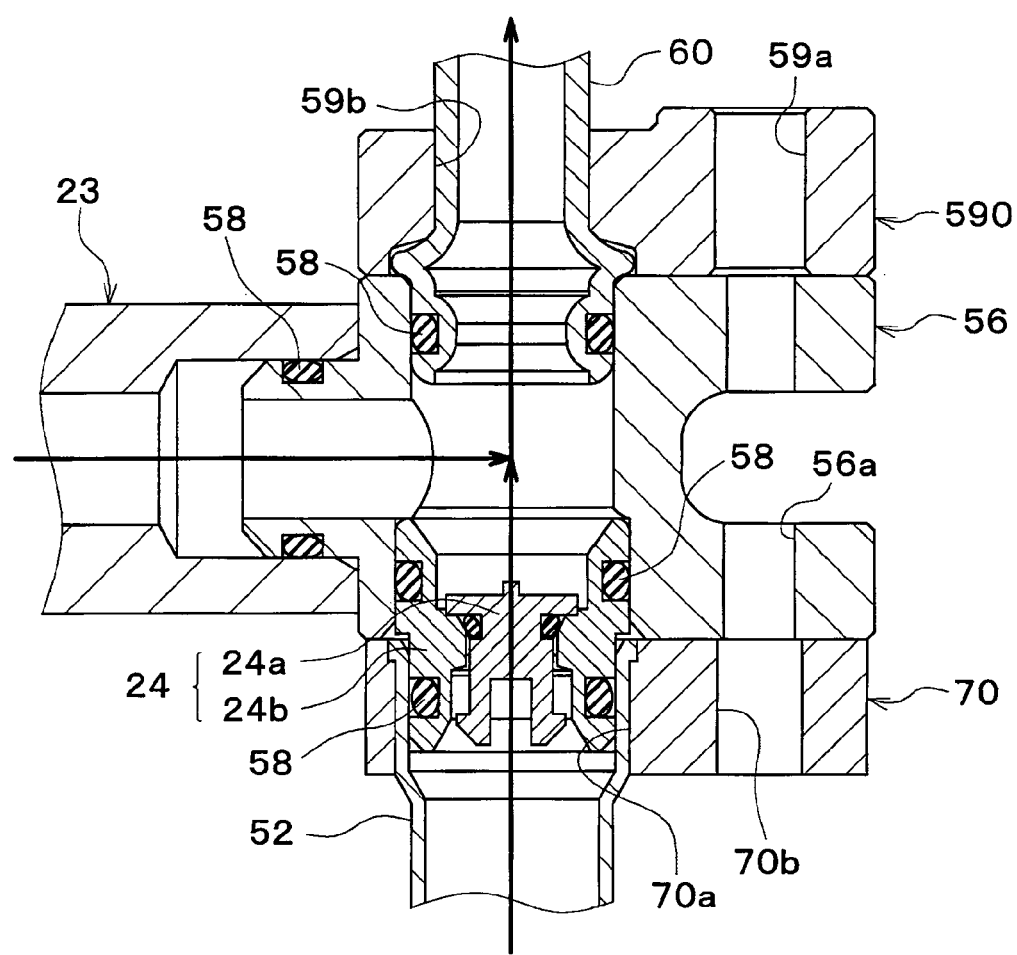
FIG. 17 is a cross-sectional view illustrating a second opening-and-closing valve and a second outlet side connector according to a seventh embodiment of the present disclosure.
Figure 18:
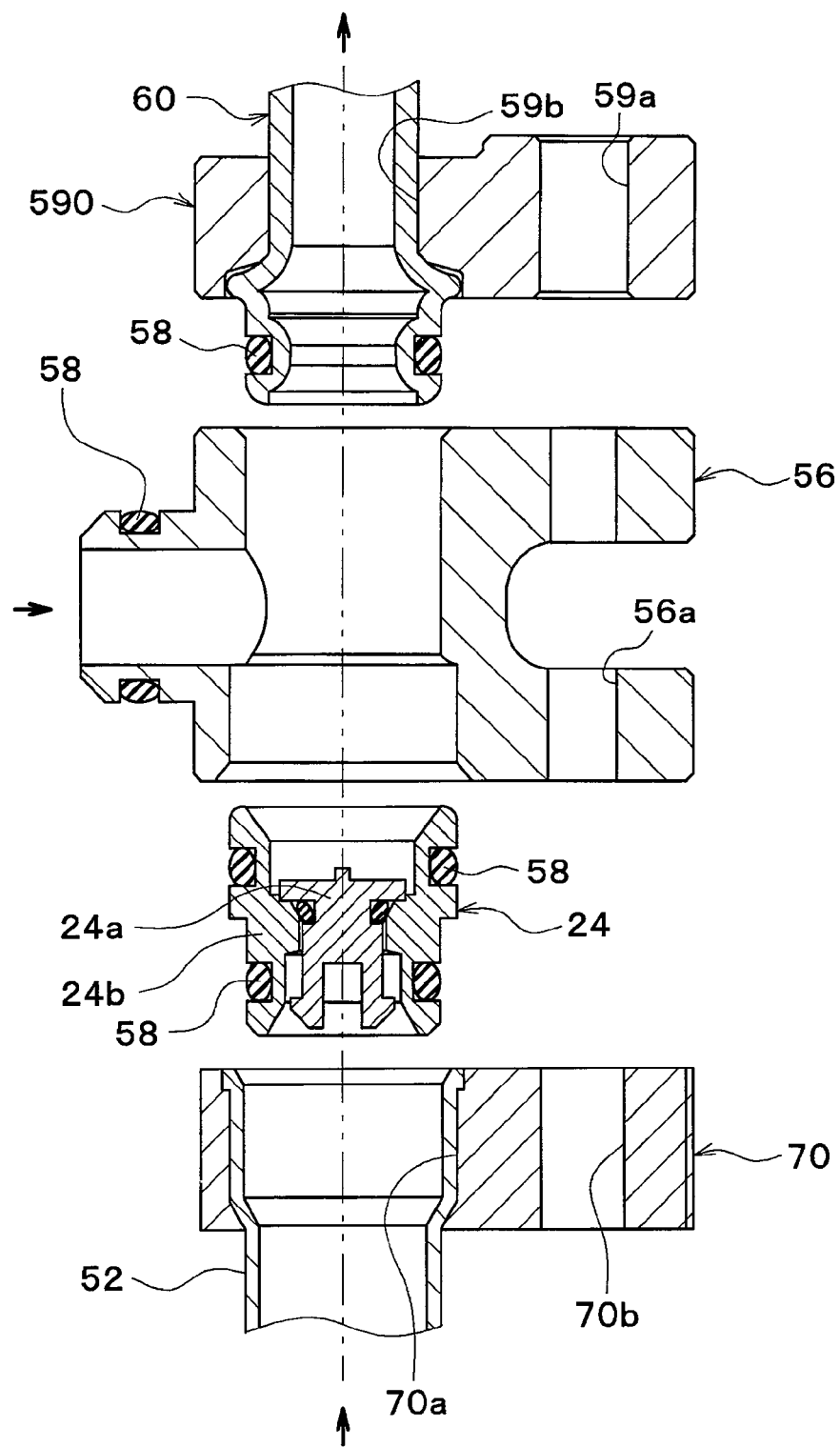
FIG. 18 is an exploded cross-sectional view illustrating the second opening-and-closing valve, and the second outlet side connector according to the seventh embodiment.

In the first embodiment, since one female socket portion of the check valve 24 is inserted into the check valve connector 53. In the present embodiment, however, as illustrated in FIG. 17 and FIG. 18, the check valve connector 53 is eliminated, and one male socket portion of the check valve 24 is inserted into the end portion of the check valve inlet side refrigerant pipe 52.

The end portion of the check valve inlet side refrigerant pipe 52 is inserted into a pipe insertion hole 70a of a pipe fastening connector 70 (a second fixing member), and is fixed to the pipe fastening connector 70 by a swaging joint.

Figure 19:
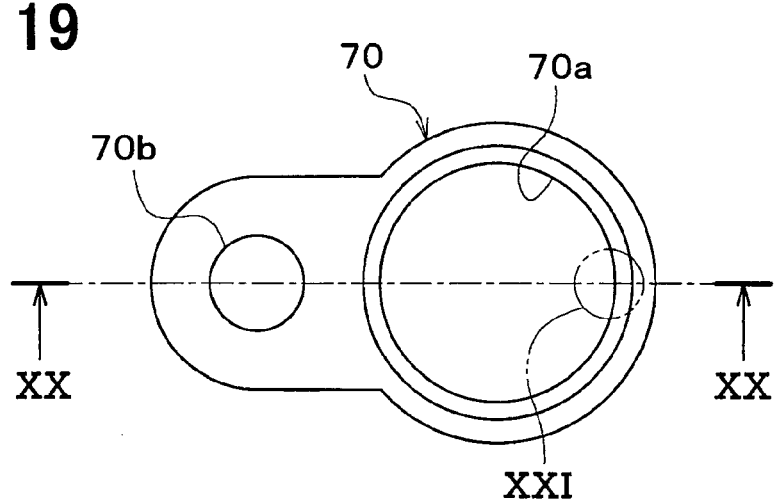
FIG. 19 is a top view illustrating a pipe fastening connector according to the seventh embodiment.
Figure 20:
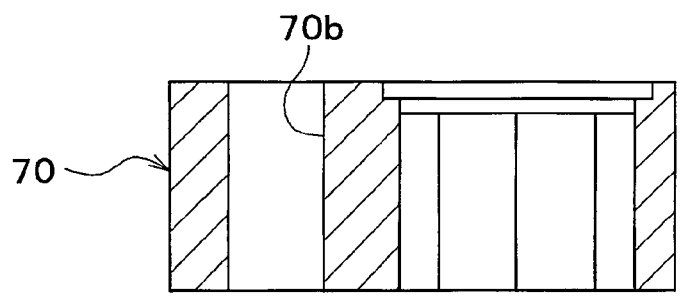
FIG. 20 is a cross-sectional view taken along a line XX-XX in FIG. 19.

As illustrated in FIG. 19 and FIG. 20, the pipe fastening connector 70 is provided with a bolt fastening hole 70b coaxially with the female screw hole 56a of the second outlet side connector 56. The bolt fastening hole 70b is a hole for allowing passage of the bolt, and is a hole having a diameter larger than that of the bolt.

Figure 21:
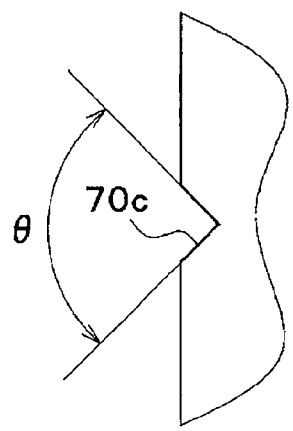
FIG. 21 is an enlarged view of a XXI-XXI portion in FIG. 19.

As illustrated in FIG. 21, a groove 70c is formed on an inner peripheral surface of the pipe insertion hole 70a of the pipe fastening connector 70. The groove 70c extends in an axial direction of the pipe insertion hole 70a, and is formed over the entire area of the pipe insertion hole 70a in a longitudinal direction (vertical direction in FIG. 21). In this example, eight of the grooves 70c are formed in the peripheral direction of the pipe insertion hole 70a equidistantly, and an angle θ of a cross-section of the groove 70c is approximately 90°.

The groove 70c provides a gap between an outer peripheral surface of the check valve inlet side refrigerant pipe 52 and an inner peripheral surface of the pipe insertion hole 70a of the pipe fastening connector 70.

Figure 22:
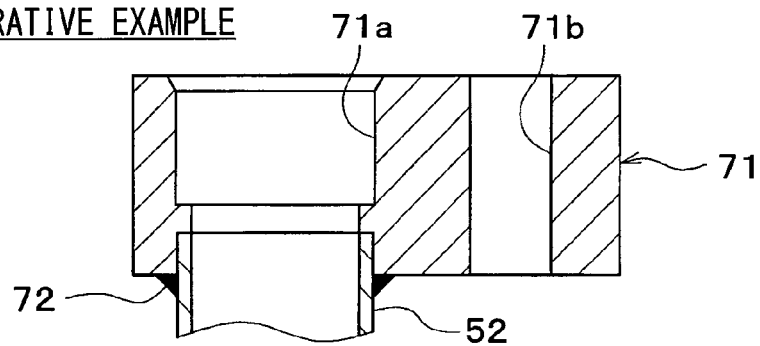
FIG. 22 is a cross-sectional view illustrating a pipe fastening connector joined to a check valve inlet side refrigerant pipe with brazing, according to a comparative example.

FIG. 22 illustrates a pipe fastening connector 71 used in a comparative example in which the check valve inlet side refrigerant pipe 52 is joined by brazing. The pipe fastening connector 71 is provided with a pipe insertion hole 71a and a bolt fastening hole 71b. In this comparative example, the outer peripheral surface of the check valve inlet side refrigerant pipe 52 and the end surface of the pipe fastening connector 71 are brazed.

As in the comparative example illustrated in FIG. 22, in the case where the check valve inlet side refrigerant pipe 52 is joined to the pipe fastening connector 71 by brazing, as described above, if a low-pressure refrigerant at a temperature of 0° C. or below flows, a crack grows by building up of ice in the pin hole at the brazing portion and the refrigerant may leak from the crack.

In view of this point, in the embodiment illustrated in FIG. 17 to FIG. 21, the check valve inlet side refrigerant pipe 52 is joined to the pipe fastening connector 70 by a swaging joint, and is not joined by brazing. Therefore, the refrigerant leakage by building up of ice is restricted.

In addition, in the example illustrated in FIG. 17 to FIG. 21, the check valve inlet side refrigerant pipe 52 is joined to the pipe fastening connector 70 by the swaging joint, and hence the thickness of the pipe fastening connector 70 can be reduced in comparison with the comparative example of FIG. 22 in which the check valve inlet side refrigerant pipe 52 is joined by brazing. Therefore, since thermal capacity of the pipe fastening connector 70 is reduced, if the operation of the refrigeration cycle is stopped, the defrosting can easily occur, and hence the glow of ice can be restricted. If the ice grows, ice can be released from a gap formed by the groove 70c of the pipe fastening connector 71 to the side opened to the atmosphere. Therefore, deformation of the refrigerant piping can be restricted.

(Eighth Embodiment)

Figure 23:
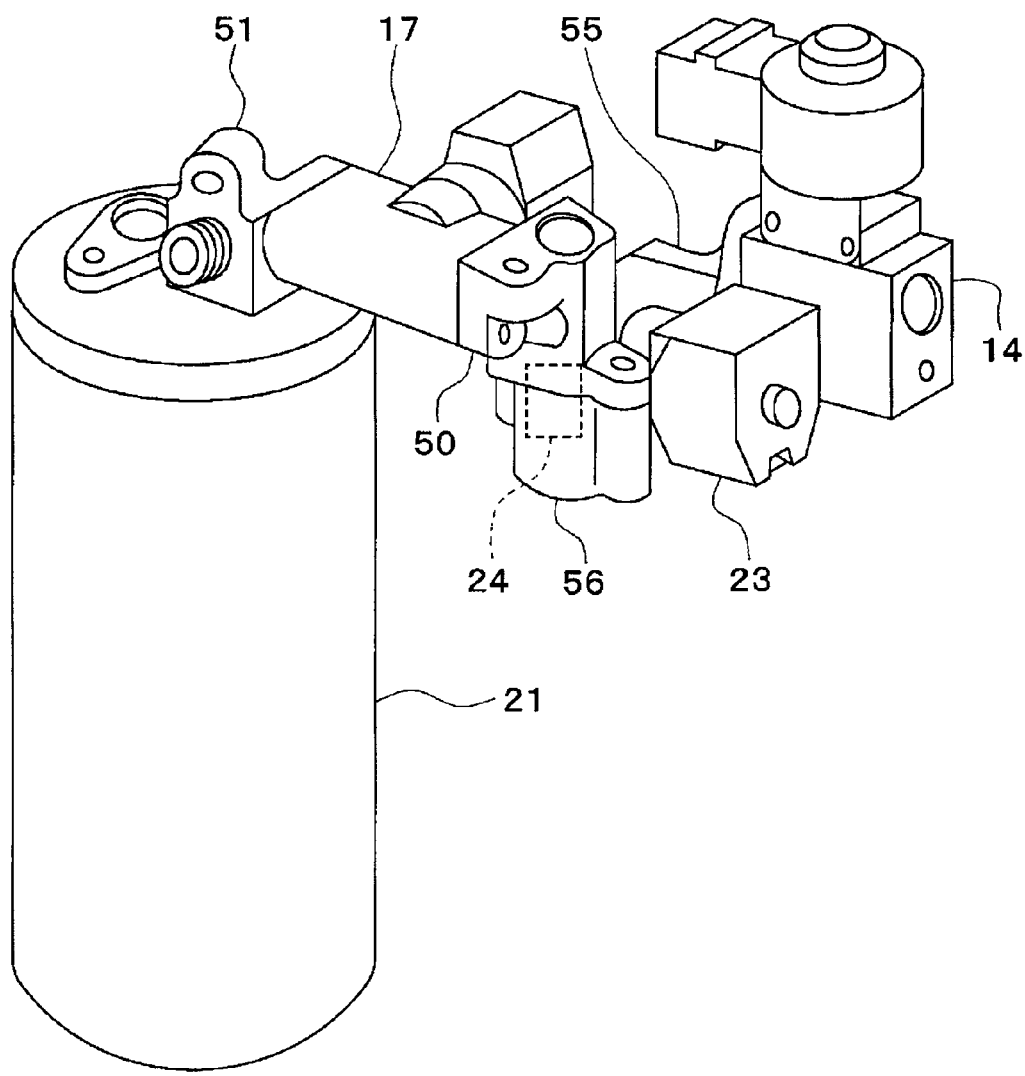
FIG. 23 is a perspective view illustrating a first module, a second module, and an accumulator according to an eighth embodiment of the present disclosure.

In the first embodiment, the first modules 17, 50, 51 and the second modules 23, 55, 56, 14, 24, 53 are coupled via the check valve inlet side refrigerant pipe 52, and the first modules 17, 50, 51 and the accumulator 21 are coupled via the accumulator inlet-side refrigerant pipe 54. In the present embodiment, however, as illustrated in FIG. 23, the first modules 17, 50, 51 and the second modules 23, 55, 56, 14, 24, and the accumulator 21 are coupled without the intermediary of the refrigerant piping. Specifically, the accumulator 21 is directly fastened to the first outlet side connector 51 with a bolt.

In addition, in the present embodiment, the check valve connector 53 of the second modules is eliminated. Specifically, one of the male socket portions of the check valve 24 is inserted into the female socket portion of the second outlet side connector 56 in the same manner as the first embodiment, and the other male socket portion of the check valve 24 is inserted into the female socket portion of the first inlet side connector 50 unlike the first embodiment.

According to the present embodiment, a solid block of space as a whole is required. However, since the number of components for piping may be reduced, the cost increase is restricted. Since the pressure loss of the refrigerant may be reduced by the reduction of the piping member, the capacity of the refrigerant flow channel may be reduced, and hence the sealed amount of the refrigerant or the refrigerant oil may be reduced.

Modification of the present disclosure will be described below. (1) In the fourth embodiment, the refrigerant outlet port of the second inlet side connector 55 is directly connected to the refrigerant inlet port of the first expansion valve 14, and the refrigerant outlet port of the second outlet side connector 56 is directly connected to the refrigerant inlet port of the second expansion valve 19. However, the refrigerant outlet port of the second inlet side connector 55 may be connected to the refrigerant inlet port of the first expansion valve 14 via the refrigerant piping.

In other words, as long as the refrigerant outlet port of at least one of the second inlet side connector 55 and the second outlet side connector 56 is directly connected to the refrigerant inlet port of at least one of the first expansion valve 14 and the second expansion valve 19, the refrigerant piping between at least one of the connectors and one of the expansion valves is not necessary. Therefore, an occupied space within the vehicle can be reduced and the number of components may be reduced. The pressure loss of the refrigerant can be reduced and hence the cooling performance and the heating performance can be improved.

(2) In the respective embodiments described above, the refrigeration cycle device 10 includes the inside condenser 12 to heat the air blown to the vehicle interior via heat exchange between the refrigerant (high pressure refrigerant) discharged from the compressor 11 and the air that has passed through the inside evaporator 20. However, instead of the inside condenser 12, the refrigeration cycle device 10 may include a radiator configured to heat a heat medium (e.g., water) via heat exchange between the refrigerant (high pressure refrigerant) discharged from the compressor 11 and the heat medium, and a heating heat exchanger (heat-medium air heat exchanger) configured to heat the air blown to the vehicle compartment via heat exchange between the heat medium heated by the radiator and the air that has passed through the inside evaporator 20.

(3) In the respective embodiments described above, an example in which the heating mode, the cooling mode, and the dehumidification heating mode are switched by the operation signal of the A/C switch has been described. However, the present disclosure is not limited thereto. For example, operation mode setting switches used to set the respective operation modes are provided on the operation panel, and the heating mode, the cooling mode, and the dehumidification heating mode may be switched according to operation signals of the operation mode setting switches.

(4) In the respective embodiments described above, examples in which the control device operates the air mixing door 36 at the time of each of the operation modes, such as the heating mode, the cooling mode, and the dehumidification heating mode so as to allow the air mixing door 36 to close any one of the air passage of the inside condenser 12 and the heater core 34 and the cold air bypass passage 35 have been described, but the operation of the air mixing door 36 is not limited thereto.

For example, the air mixing door 36 may be adapted to open both the air passage of the inside condenser 12 and the heater core 34 and the cold air bypass passage 35. Furthermore, it may be possible to adjust the temperature of air, which is blown into the vehicle interior, by adjusting a rate of the air volume between the air volume of air passing through the air passage of the inside condenser 12 and the heater core 34 and the air volume of air passing through the cold air bypass passage 35. This temperature adjustment is effective in terms of the fine adjustment of the temperature of the air blown to the vehicle interior.

(5) In the respective embodiments described above, a configuration in which the heater core 34 is arranged in the interior of the inside air conditioning unit 30 has been described. However, in the case where an external heat source such as an engine is insufficient, the heater core 34 may be eliminated or may be replaced with an electric heater.

(6) In the respective embodiments described above, examples in which the refrigeration cycle device 10 is applied to the vehicle air conditioning apparatus 1 have been described. However, the present disclosure is not limited thereto, and the refrigeration cycle device 10 may be applied to the installation type air-conditioning apparatus, for example.

Figure 24:
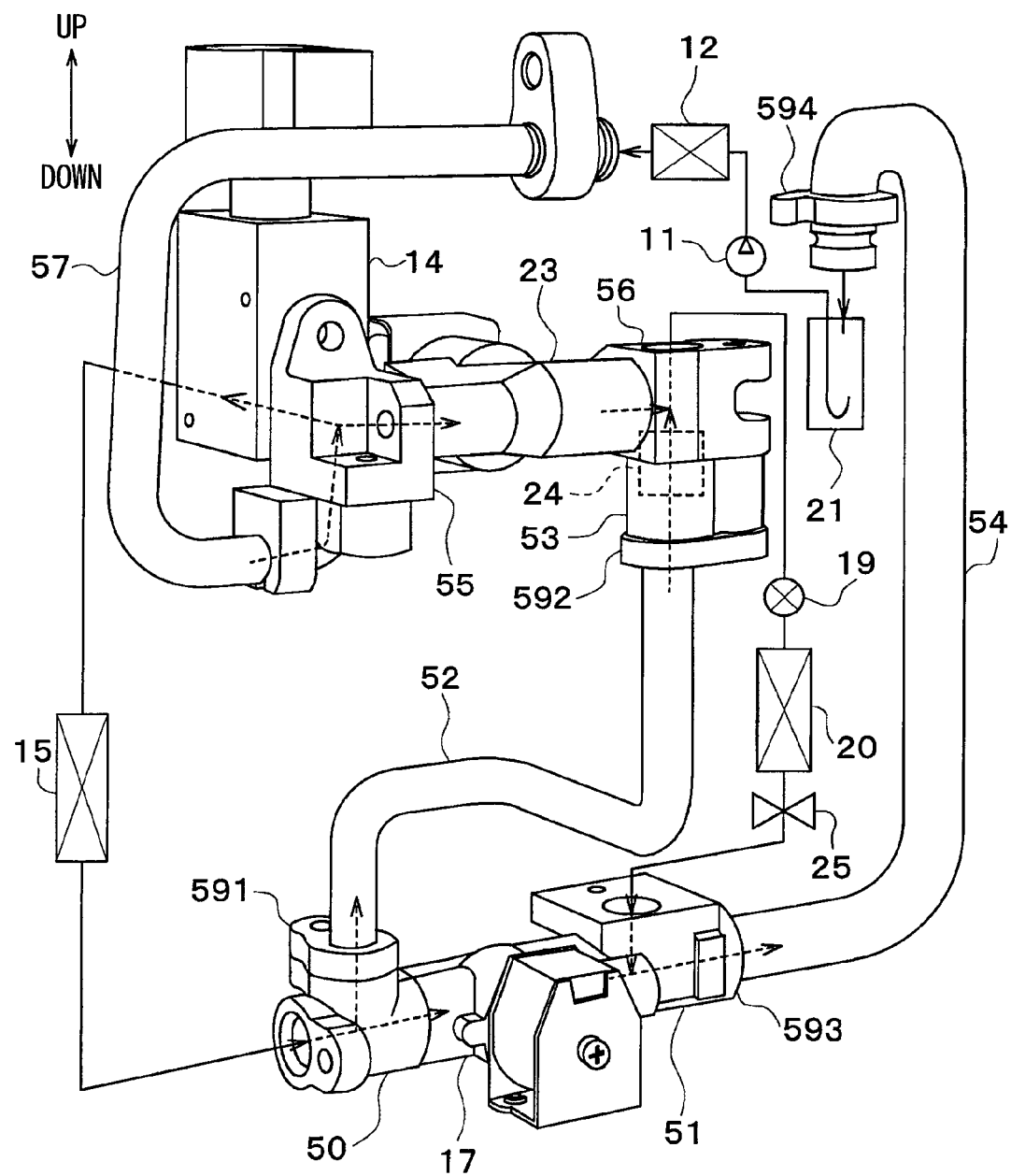
FIG. 24 is a schematic perspective view illustrating a piping connection structure of a refrigeration cycle device according to a modification.

(7) As illustrated in FIG. 24, in the respective embodiments described above, a constant-pressure regulating valve 25 may be arranged on the refrigerant outlet side of the inside evaporator 20. The constant-pressure regulating valve 25 is a constant-pressure regulating apparatus in which the pressure of the refrigerant is maintained at a predetermined pressure. In this configuration, the refrigerant pressure of the inside evaporator 20 may be maintained at a predetermined pressure (constant pressure).

For example, the constant-pressure regulating valve 25 includes a mechanical constant pressure valve configured to maintain the pressure of the refrigerant at a predetermined constant pressure by a mechanical mechanism. The constant-pressure regulating valve 25 includes an electronic control valve configured to maintain the pressure of the refrigerant at a predetermined constant pressure by electronic control.

In the example in FIG. 24, the constant-pressure regulating valve 25 is arranged upward in the direction of the gravitational force of the refrigerant inlet port of the first outlet side connector 51. In this configuration, accumulation of the refrigerant or the refrigerant oil on the refrigerant flow downstream side of the constant-pressure regulating valve 25 and the inside evaporator 20 (accumulation of the refrigerant and the refrigerant oil at a specific portion) may be restricted.

What is claimed is:

1. A refrigeration cycle device for an air-conditioning apparatus that performs a dehumidification operation in which an air blown to a space to be air-conditioned is cooled and dehumidified and the dehumidified blown air is heated, the refrigeration cycle device comprising:
    a compressor that compresses and discharges a refrigerant;
    a radiator in which the refrigerant discharged from the compressor radiates a heat;
    an outside heat exchanger in which the refrigerant flowing out of the radiator exchanges heat with an outside air;
    an evaporator in which the refrigerant flowing out of the outside heat exchanger is evaporated via heat exchange between the refrigerant flowing out of the outside heat exchanger and the blown air before passing through the radiator;
    a first refrigerant passage guiding the refrigerant flowing out of the radiator to an inlet side of the outside heat exchanger;
    a first throttling device having two refrigerant ports to or from which the refrigerant flows in or out, the first throttling device being disposed in the first refrigerant passage and being capable of changing an open area of the first refrigerant passage;
    a second refrigerant passage guiding the refrigerant flowing out of the outside heat exchanger to an intake side of the compressor;
    a first switching device having two refrigerant ports to or from which the refrigerant flows in or out, the first switching device being disposed in the second refrigerant passage and selectively stopping a flow of the refrigerant in the second refrigerant passage;
    a third refrigerant passage branching from the second refrigerant passage and joining to the second refrigerant passage, the third refrigerant passage guiding the refrigerant flowing out of the outside heat exchanger to the intake side of the compressor through the evaporator;
    a second throttling device having two refrigerant ports to or from which the refrigerant flows in or out, the second throttling device being disposed between the outside heat exchanger and the evaporator in the third refrigerant passage and being capable of changing an open area of the third refrigerant passage;
    a bypass passage branching from the first refrigerant passage and joining to the third refrigerant passage, the bypass passage guiding the refrigerant flowing between the radiator and the first throttling device to a part of the third refrigerant passage between the outside heat exchanger and the second throttling device;
    a second switching device having two refrigerant ports to or from which the refrigerant flows in or out, the second switching device being disposed in the bypass passage and selectively stopping the flow of the refrigerant in the bypass passage; and
    a flow channel coupling member having three refrigerant ports to or from which the refrigerant flows in or out, the flow channel coupling member being provided in at least one of a branching portion and a joining portion of the third refrigerant passage and a branching portion and a joining portion of the bypass passage, wherein
    one of the three refrigerant ports of the flow channel coupling member is directly connected to one of the two refrigerant ports of the first switching device or one of the two refrigerant ports of the second switching device,
    the refrigeration cycle device further comprising a sealing mechanism provided in a connecting portion between the refrigerant port of the flow channel coupling member and the refrigerant port of the first switching device or in a connecting portion between the refrigerant port of the flow channel coupling member and the refrigerant port of the second switching device, the sealing mechanism preventing a refrigerant leakage, and
    the flow channel coupling member has a portion that is different in position from the sealing mechanism and is fixed to the first switching device or the second switching device.

2. The refrigeration cycle device according to claim 1, wherein another of the three refrigerant ports of the flow channel coupling member is connected directly with the refrigerant inlet port of at least one of the first throttling device and the second throttling device.

3. The refrigeration cycle device according to claim 1, wherein the flow channel coupling member includes a first flow channel coupling member provided in the branching portion of the third refrigerant passage, and a second flow channel coupling member provided in the joining portion of the bypass passage, the refrigeration cycle device further comprising:
a first piping member having a refrigerant passage between the first flow channel coupling member and the second flow channel coupling member in the third refrigerant passage;
a first fixing member fixing one end of the first piping member to the first flow channel coupling member; and
a second fixing member fixing the other end of the first piping member to the second flow channel coupling member.

4. The refrigeration cycle device according to claim 3, wherein
at least one of the first fixing member and the second fixing member includes a pipe insertion hole into which the first piping member is inserted, and
a gap for releasing ice formed by freezing of moisture in an atmospheric air to an atmosphere is provided between an inner peripheral surface of the pipe insertion hole and an outer peripheral surface of the first piping member.

5. The refrigeration cycle device according to claim 3, wherein the flow channel coupling member includes a third flow channel coupling member provided in the joining portion of the third refrigerant passage,
the refrigeration cycle device further comprising:
an accumulator disposed between the joining portion of the third refrigerant passage to the second refrigerant passage and the compressor, the accumulator separating the refrigerant into gas and liquid and accumulating therein an excessive refrigerant within a cycle;
a second piping member having a refrigerant passage between the joining portion of the third refrigerant passage to the second refrigerant passage and the accumulator;
a third fixing member fixing one end of the second piping member to the third flow channel coupling member; and
a fourth fixing member fixing the other end of the second piping member to the accumulator.

6. The refrigeration cycle device according to claim 3, comprising a check valve disposed between the first flow channel coupling member and the second flow channel coupling member, the check valve prohibiting a flow of the refrigerant from the first flow channel coupling member to the second flow channel coupling member, wherein
one of the three refrigerant ports of the first flow channel coupling member, which is connected to the check valve, is positioned apart and downward by 100 mm or more from the check valve in a direction of a gravitational force.

7. The refrigeration cycle device according to claim 3, wherein
the flow channel coupling member includes a fourth flow channel coupling member provided in the branching portion of the bypass passage, and
the fourth flow channel coupling member includes a refrigerant flow channel extending horizontally from the fourth flow channel coupling member toward the first throttling device and a refrigerant flow channel extending horizontally from the fourth flow channel coupling member toward the second switching device.

8. The refrigeration cycle device according to claim 3, wherein
the flow channel coupling member includes a fourth flow channel coupling member provided in the branching portion of the bypass passage, and
the fourth flow channel coupling member includes a first refrigerant flow channel leading from a refrigerant inlet port connected to the radiator to a refrigerant outlet port connected to the first throttling device, and a second refrigerant flow channel branching from the first refrigerant flow channel to another refrigerant outlet port connected to the second switching device,
the first refrigerant flow channel extends upward in a direction of a gravitational force, and
the second refrigerant flow channel extends in a horizontal direction.

9. The refrigeration cycle device according to claim 1, wherein the flow channel coupling member has the portion that is different in position from the sealing mechanism and is fixed to the first switching device or the second switching device with a bolt.

10. The refrigeration cycle device according to claim 1, comprising a constant-pressure regulating apparatus disposed on a refrigerant outlet side of the evaporator and maintaining a pressure of the refrigerant on the refrigerant outlet side of the evaporator at a predetermined pressure.

11. The refrigeration cycle device according to claim 10, wherein the flow channel coupling member includes a third flow channel coupling member provided in the joining portion of the third refrigerant passage, and
the constant-pressure regulating apparatus is located higher in a direction of a gravitational force than one of the three refrigerant ports of the third flow channel coupling member connected to the constant-pressure regulating apparatus.

12. A piping connection structure comprising:
a flow channel coupling member including at least first to third refrigerant ports to or from which a refrigerant flows in or out;
a switching device connected directly to the first refrigerant port to selectively stop a refrigerant flow from the flow channel coupling member; and
a sealing mechanism provided in a connecting portion between the flow channel coupling member and the switching device, the sealing mechanism preventing a refrigerant leakage, wherein
the flow channel coupling member has a portion that is different in position from the sealing mechanisms and is fixed to the switching device.

13. The piping connection structure according to claim 12, further comprising a throttling device connected directly to the second refrigerant port of the flow channel coupling member and capable of adjusting a flow rate of the refrigerant flowing out from the flow channel coupling member.

14. The piping connection structure according to claim 12, being used for a refrigeration cycle device,
the piping connection structure being provided in a refrigerant passage of the refrigeration cycle device in which the refrigerant flows from an evaporator, in which the refrigerant evaporates, to a compressor that compresses the refrigerant, wherein
the switching device selectively stops a refrigerant flow from the evaporator to the compressor.

15. The piping connection structure according to claim 13, being used for a refrigeration cycle device,
the piping connection structure being provided in a refrigerant passage of the refrigeration cycle in a refrigerant passage device in which the refrigerant flows from a condenser, which condenses the refrigerant, to an evaporator in which the refrigerant evaporates, wherein the switching device selectively stops a refrigerant flow from the condenser to the evaporator.

* * * * *